United States Patent
Kake et al.

(10) Patent No.: US 7,101,284 B2
(45) Date of Patent: Sep. 5, 2006

(54) OBJECT DISPLAY SYSTEM IN A VIRTUAL WORLD

(75) Inventors: Tomokazu Kake, Tokyo (JP); Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 175 days.

(21) Appl. No.: 10/286,731

(22) Filed: Oct. 31, 2002

(65) Prior Publication Data

US 2003/0126035 A1 Jul. 3, 2003

(30) Foreign Application Priority Data

Dec. 18, 2001  (JP)  ......................... 2001-385209
Dec. 18, 2001  (JP)  ......................... 2001-385212
Dec. 18, 2001  (JP)  ......................... 2001-385219
Sep. 26, 2002  (JP)  ......................... 2002-281729

(51) Int. Cl.
   *A63F 13/00*   (2006.01)

(52) U.S. Cl. .......................... 463/31; 463/33
(58) Field of Classification Search ............. 463/30–33, 463/1, 42
   See application file for complete search history.

(56) References Cited

U.S. PATENT DOCUMENTS 6,036,601 A * 3/2000 Heckel .......................... 463/42
6,336,864 B1 * 1/2002 Nakanishi .................... 463/33
6,656,051 B1 * 12/2003 Ishii et al. ..................... 463/43

FOREIGN PATENT DOCUMENTS

| EP | 0 752 678 A2 | 1/1997 |
| EP | 0 752 678 A3 | 4/1998 |
| EP | 1 134 009 A2 | 9/2001 |
| EP | 1 134 009 A3 | 4/2003 |
| JP | 11-144083 | 5/1999 |
| JP | 2000-163178 | 6/2000 |
| JP | 2001-312645 | 11/2001 |
| WO | WO95/35555 | 12/1995 |
| WO | WO 01/69512 A1 | 9/2001 |

OTHER PUBLICATIONS

Business Editors. "fetchOmatic.com Hits Wall Street With A Bang". Business Wire. New York: Sep. 7, 2000.*
Tin, Annie. Tourism Report is Guidebook for Area Businesses: [Central Florida Edition]. The Orlando Sentinel. Orlando, Florida: Nov. 3, 1990.*
Gwartney, Ted. "Estimating Land Values". Jul. 1999, [on-line]. Retrieved from the Internet [May 24, 2004]. URL:<http://www.geocities.com/bororissa/land.html>.*
European Patent Office; Copy of PCT International Search Report (International Application No. PCT/JP 02/11455), dated May 28, 2003.
Japanese Patent Office, "Decision of Refusal", cited in counterpart Japanese Patent Application No. 2002-281729, dated Jul. 19, 2005, 4 pages.
Japanese Patent Office, "Notification of Reason(s) for Refusal", cited in counterpart Japanese Patent Application No. 2002-281729, dated Mar. 15, 2005, 6 pages.

* cited by examiner

*Primary Examiner*—Julie Brocketti
(74) *Attorney, Agent, or Firm*—Fitch, Even, Tabin & Flannery

(57) ABSTRACT

An apparatus for displaying an object such as a billboard in a virtual world is provided. An input history of a user's operation for moving a character in the virtual world is obtained. The movement track of the character in the virtual world is also obtained. The position and direction of the billboard are changed according to the input history and the movement track so that the billboard is visible to the user. For instance, on a street where the user is expected to move at a high speed, the direction of the billboard is changed so that its display surface can face the front of the character and the billboard is displayed in a position far away from the user's viewing position.

39 Claims, 27 Drawing Sheets

OBJECT DISPLAY SYSTEM IN A VIRTUAL WORLD

BACKGROUND OF THE INVENTION

1. Field of the Invention

The present invention relates to an object display technology, and it particularly relates to method, apparatus, and system for displaying an object such as a billboard and a message board in a virtual world that is provided by a server on a designated network such as the Internet. The present invention also relates to method for setting a land value and an advertisement fee in the virtual world.

2. Description of the Related Art

Today, virtual world systems are being used in which the server, which is connected to a designated network like the Internet, provide the virtual world. In such systems, the players explore the virtual world by controlling their favorite characters or communicate with one another through their characters.

In a virtual world, which is provided by such a virtual world system, objects such as billboards and message boards are often displayed, on which sponsors advertise their enterprises and merchandise to the players who visit the virtual world, or through these the system administrator of the virtual world informs players of important information and such.

Such objects as billboards and message boards are meaningless unless the players see them. Therefore, they tend to be displayed in the area where the players' characters gather, for example, in the central area of town or along the main street in the virtual world. In this way, many players will see the displayed billboards and message boards. As a result, it is possible to attain significant advertising impact for an enterprise or merchandise, or to have many players view important information, etc.

However, since the action pattern of a player's character in the virtual world varies, not all the players' characters necessarily gather in the central area or places where the level of human traffic is higher. Therefore, displaying objects like a billboard only in the central area of town or places where the level of human traffic is higher is not enough to show an advertisement of an enterprise or merchandise, or send the important information to every player.

As described above, it is important to have as many players as possible see the important information or the like, and consequently many billboards and message boards tend to be displayed in close proximity to one another in the central area of town and in places where the level of human traffic is higher. In such a condition, if, for example, the server in charge of managing the virtual world has displayed important information such as maintenance related information in a busy area, the message board, on which such important information is displayed, might be lost among the clutter of so many other billboards and message boards, and become barely recognizable to the players. Consequently, players may be inconvenienced because they failed to see some important information.

To prevent this kind of problem from occurring, setting up a separate display area in the virtual world, which is irrelevant to the landscape and streetscape, to display important information may be considered. By displaying important information using this method, it is possible to have the players easily recognize the important information, etc. even in areas where there are numerous billboards and message boards in close proximity to one another. However, such a method of displaying important information might reduce the area available for landscapes and streetscapes in the virtual world, and negatively impact the image of the virtual world.

In addition, just as in the real world, when a user has an object displayed in the virtual world, for example, such as having a store in the virtual world, the system administrator will levy a fee. The fee is calculated based on the land value which is determined by taking into account the level of human traffic and convenience, etc.: a higher land value will be set for areas which for example are in the vicinity of a station or busy shopping area and a lower land value will be set for suburbs. However, the places users visit vary by their hobbies and tastes. Therefore, if land values are determined only by taking into account the level of human traffic and convenience, inappropriate land values will be determined in the virtual world which do not accurately reflect the sense of land value perceived by each individual player. This is certainly not the ideal means to do this.

Further, just as in the real world, when an advertiser has an object like a billboard installed in the virtual world to display an advertisement, the system administrator will determine the advertisement fee by taking into account the possible number of users who might see the advertisement: a higher advertisement fee will be set for areas where the level of human traffic is higher such as in the vicinity of a station or busy shopping area. However, the area in the virtual world where many users may gather will fluctuate according to the hobbies and tastes of the users, or the buildings constructed and types of stores located. Therefore, if advertisement fees are determined only by using a fixed method such as setting a higher advertisement fee for the areas where the level of human traffic is higher, they will not adequately correspond to the fluctuation of the condition in the virtual world. As a result, an advertiser might be charged an inappropriate advertisement fee, which is also not ideal.

SUMMARY OF THE INVENTION

The present invention has been made with a view to the above-mentioned problems, and an object thereof is to provide an object display technique in a virtual world which can display an object such as a billboard and a message board so that in all probability the object will be viewable to all players who visit the virtual world. Another object of the present invention is to provide a land value setting technique in a virtual world which can set for each user an appropriate land value for an area in the virtual world. Yet another object of the present invention is to provide an advertisement fee setting technique in a virtual world which can set for each user an appropriate advertisement fee of an area in the virtual world.

According to one aspect of the present invention, an object display apparatus is provided. The apparatus comprises an input history obtaining unit which obtains an input history of a user's operation for moving an operational object in a virtual world and stores the input history as a user profile, a discriminating unit which examines whether or not a current operation of the user for moving the operational object reflect the stored input history and thereby determines whether the user profile needs to be applied or not, and a display control unit which displays a display object on which information is displayed to be recognized by the user in the virtual world in such a manner that the display object is visible to the user according to speed of movement of the operational object which is judged from the input history, when the discriminating unit determines that the user profile needs to be applied.

The user herein is a player who explores the virtual world while operating an object such as a character, however, even in the case where such an operational object is not displayed in the virtual world and the display image changes three-dimensionally according to the player's operation as if the player were in the virtual world, the player is regarded to be operating an operational object of the player in the virtual world. It is meant herein by displaying the display object in such a manner that it is visible to the user that the display position and direction of the display object are changed so that the visibility of the user who sees information displayed on the display object can be improved. The information displayed on the display object is, for instance, an advertisement, however it can be any information to be recognized by the user, such as an announcement of server maintenance or updating data in the virtual world.

According to another aspect of the present invention, an object display apparatus is provided. The apparatus comprises a movement track obtaining unit which obtains a movement track of an operational object which can be operated by a user in a virtual world and stores the movement track as a user profile, a discriminating unit which examines whether or not the operational object is moving along the stored movement track and thereby determines whether the user profile needs to be applied or not, and a display control unit which displays a display object on which information is displayed to be recognized by the user in the virtual world in such a manner that the display object is visible to the user based on the movement track of the operational object, when the discriminating unit determines that the user profile needs to be applied.

According to still another aspect of the present invention, an object display apparatus is provided. The apparatus comprises a movement track obtaining unit which obtains a movement track of an operational object which each of a plurality of users operates in a virtual world and determines an area where the operational objects of the respective users gather, and a display control unit which displays a display object on which information is displayed to be recognized by a user in such a manner that the display object is visible to a user who comes in the area in the virtual world where the operational objects gather.

According to still another aspect of the present invention, an object display system is provided. The system comprises a terminal and a server which are connected to a network. The terminal comprises an obtaining unit which obtains data of a user's operation for moving an operational object in a virtual world, a communication unit which sends the data of the operation to the server and receives data of an object in the virtual world corresponding to the operation from the server, and a display unit which displays an image of the virtual world data using the data of the object. The server comprises an input history obtaining unit which obtains an input history of a user's movement operation from the data of the operation received from the terminal and stores the input history, and a display control unit which displays on the terminal a display object on which information is displayed to be recognized by the user in the virtual world in such a manner that the display object is visible to the user according to speed of movement of the operational object which is judged from the input history.

According to still another aspect of the present invention, a method for setting a land value in a virtual world is provided. The method comprises detecting a movement track of a user who explores the virtual world, and setting for each user a land value for an area in the virtual world based on the detected movement track of the user.

According to still another aspect of the present invention, a method for setting an advertisement fee in a virtual world is provided. The method comprises detecting movement tracks of a plurality of users who explore the virtual world, taking statistics of the detected movement tracks of the plurality of the users, and setting an advertisement fee of an area in the virtual world based on the statistics of the movement tracks of the plurality of the users.

Moreover, any arbitrary replacement or substitution of the above-described structural components and the steps, expressions replaced or substituted in part or whole between a method and an apparatus as well as addition thereof, and expressions changed to a system, a computer program, a storage medium, a transmission medium or the like are all effective as and are encompassed by the present invention.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but to exemplify the invention.

The present invention may be applied to a network game system in which the players enjoy video games by controlling objects such as characters in a virtual world formed within a game server unit on a designated network like the Internet.

It is to be noted that hereafter the present invention will be described as a network game system in which the players control objects such as characters in a virtual world, however, the present invention may be applied to a network game system in which the characters to be controlled by the players do not currently exist, but where the display images in the virtual world may be changed by an input device controlled by the players.

Embodiment 1
System Configuration

Figure 1:
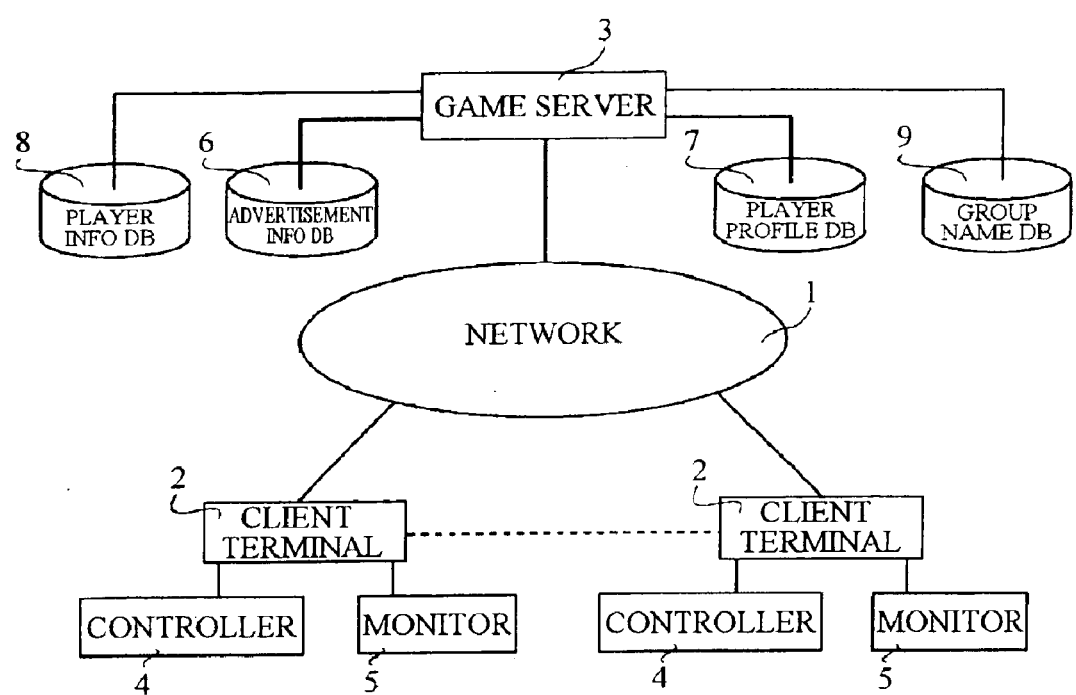
FIG. 1 is a block diagram of a network game system according to Embodiment 1 of the present invention.

FIG. 1 is a block diagram of a network game system according to Embodiment 1 of the present invention. As shown in FIG. 1, a network game system according to Embodiment 1 includes, for example, a designated network 1 such as the Internet, client terminals 2 of multiple players which can be connected to the network 1, and a game server 3 which is connected to the network 1 and provides a designated virtual world through the client terminals 2 of respective players.

For a client terminal 2, for example, a video game unit may be used. If a video game unit is used as a client terminal 2, a controller 4 will be used as the input device and a monitor 5 will be used as the display device.

In addition, other terminal units, such as personal computers may be used as a client terminal 2. When using a personal computer, the keyboard and mouse will be used as input devices.

The game server 3 includes: a database for data such as polygon data and texture data which is necessary for drawing objects such as virtual worlds and characters; an advertisement information database 6 (hereafter referred to as the "advertisement information DB") for advertisement information related to the sponsors of such a network game system to advertise such things as enterprises, merchandise, and services; and a player profile database 7 (hereafter referred to as the "player profile DB") for player profiles which consists of data such as the movement track of each player in the virtual world and the operation history of the controller 4.

Further, a game server 3 includes a player information database 8 (hereafter referred to as the "player information DB") for player information which consists of information indicating preferences such as hobbies and tastes of each player, and information indicating the stores and places in the virtual world where the players visited; and a group name database 9 (hereafter referred to as the "group name DB") for group names, which are registered when a group of players logs into the virtual world simultaneously.

Controller Configuration

Figure 2:
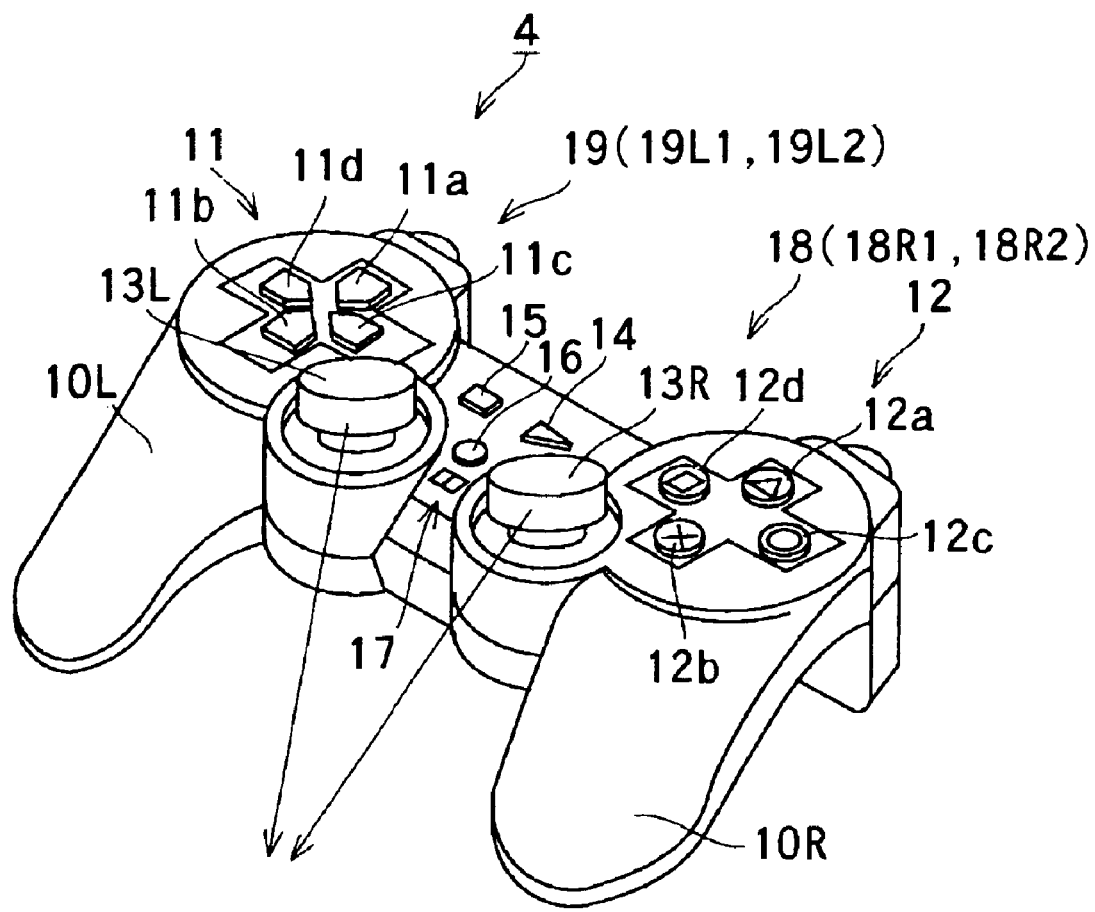
FIG. 2 is a perspective view of a controller which is connected to a client terminal in a network game system according to Embodiment 1.
Figure 2:
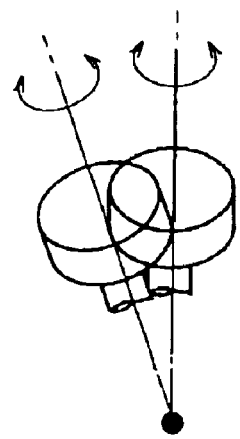

FIG. 2 shows an example of a controller 4 with which a player controls the characters in the virtual world. As shown in FIG. 2, the controller 4 includes two grippers, 10R and 10L, which a player holds with their right and left hands, respectively.

On the controller 4, the first and second operation units, 11 and 12, and the analog operation units, 13R and 13L, are configured to be in positions where a player can operate them with the respective thumbs while gripping each gripper 10R and 10L with right and left hands.

On the first operation unit 11, an upward directional-command button 11a which controls upward movement of a character or visual point, a downward directional-command button 11b which controls downward movement of a character or visual point, a rightward directional-command button 11c which controls rightward movement of a character or a visual point, and a leftward directional-command button 11d which controls leftward movement of a character or visual point, are installed.

Directional-command buttons, 11a through 11d, are configured to digitally move characters and visual points in a general direction such as moving upward, downward, leftward, rightward, diagonally to the upper left or right, and diagonally to the lower left or right.

On the second operation unit 12, there is a button 12a marked with a triangle-shaped symbol, a button 12b marked with a cross-shaped symbol, a button 12C marked with a circle-shaped symbol, and a button 12d marked with a square-shaped symbol. A player controls functions such as a character's activities by operating buttons 12a through 12d.

The home position of analog operation units, 13R and 13L, is the vertical upright position in relation to the controller 4 (position with no tilt) when no tilting is being done, and it is from this home position that the control by tilting at a designated angle and the control by turning on the spindle in a rotating axis are possible.

Analog operation units, 13R and 13L, are for controlling the movement of characters and visual points with more precise movements than those possible by the directional-command buttons, 11a through 11d, for moving upward, downward, leftward, and rightward.

Further, the controller 4 includes a start button 14 to initiate the start of a game, a select button 15 to select a designated item, and a mode selection switch 16 to select analog mode or digital mode. When the analog mode is selected with the mode selection switch 16, a light-emitting diode 17 is instructed to stay lighted and the analog operation units, 13R and 13L, becomes operational.

When the digital mode is selected with the mode selection switch 16, the light-emitting diode 17 is instructed to stay off and the analog operation units, 13R and 13L become non-operational. In this case, the movement of a character and visual point is conducted by operating the respective directional-command buttons, 11a through 11d, for moving upward, downward, leftward, and rightward, as described above.

Further, on the controller 4, a right button 18 and left button 19 are configured to be in positions where a player can operate them with the respective index fingers or middle fingers while holding grippers 10R and 10L with right and left hands. Button 18 includes the first right button 18R1 and second right button 18R2. Button 19 includes the first left button 19L1 and second left button 19L2. These buttons are aligned vertically one above the other from the base the controller 4.

When moving a character and visual point with the controller 4, a player operates the respective directional-command buttons, 11a through 11d, for moving upward, downward, leftward, and rightward, or the analog operation units, 13R and 13L, as described above. When the respective directional-command buttons, 11a through 11d, for moving upward, downward, leftward, and rightward, are operated, the controller 4 provides a client terminal 2 with the coordinate value on the X-Y coordinate according to the "Direction" and "Length of Time Button is Pressed" of the directional-command buttons. When the analog operation units, 13R and 13L, are tilted, the controller 4 provides a client terminal 2 with the coordinate value on the X-Y coordinate according to the "Tilt Amount" and "Tilt Direction" from the home position as described above.

Figure 3:
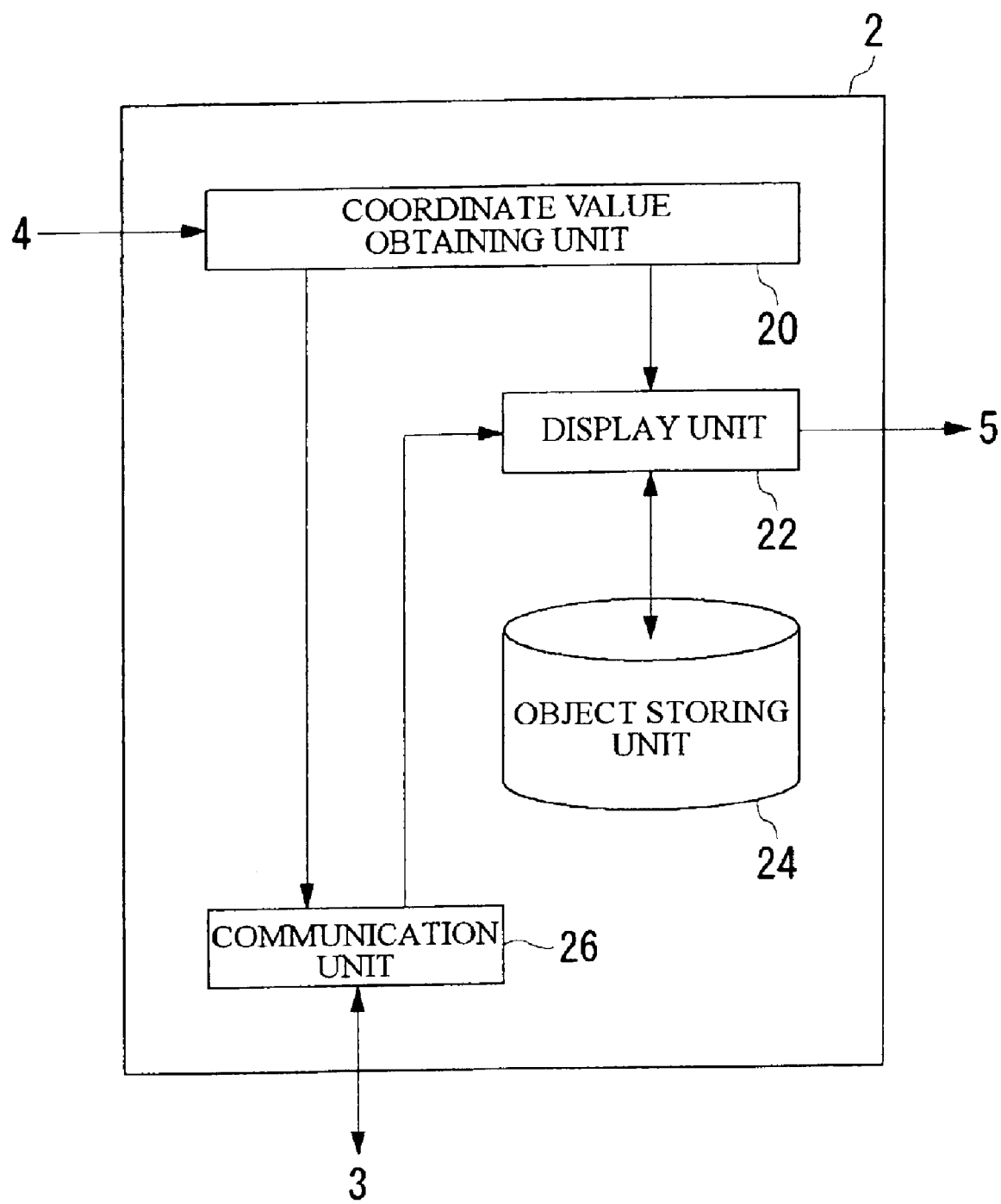
FIG. 3 shows a structure of the client terminal 2 of FIG. 1.

FIG. 3 shows a structure of the client terminal 2. A coordinate value obtaining unit 20 inputs the coordinate value provided by the controller 4 and a communication unit 26 provides the game server 3 with the coordinate value via the network 1. The communication unit 26 receives from the game server 3 the image information of the virtual world and characters corresponding to the coordinate values, and a display unit 22 displays on the screen of the monitor 5 connected to the client terminal 2 the images of the virtual world and characters in accordance with commands given through the directional-command buttons, 11a through 11d, for moving upward, downward, leftward, and rightward, or the analog operation units, 13R and 13L.

It is not always necessary to receive the image information of the virtual world and characters from the game server 3 via the network 1, and the image information of the virtual world and characters may be updated in accordance with commands given through the controller 4. In this case, the display unit 22 stores the object data of the virtual world and characters in an object storing unit 24 and updates the image information based on the coordinate value given by the coordinate obtaining unit 20, and then displays the updated image on the monitor 5.

Figure 4:
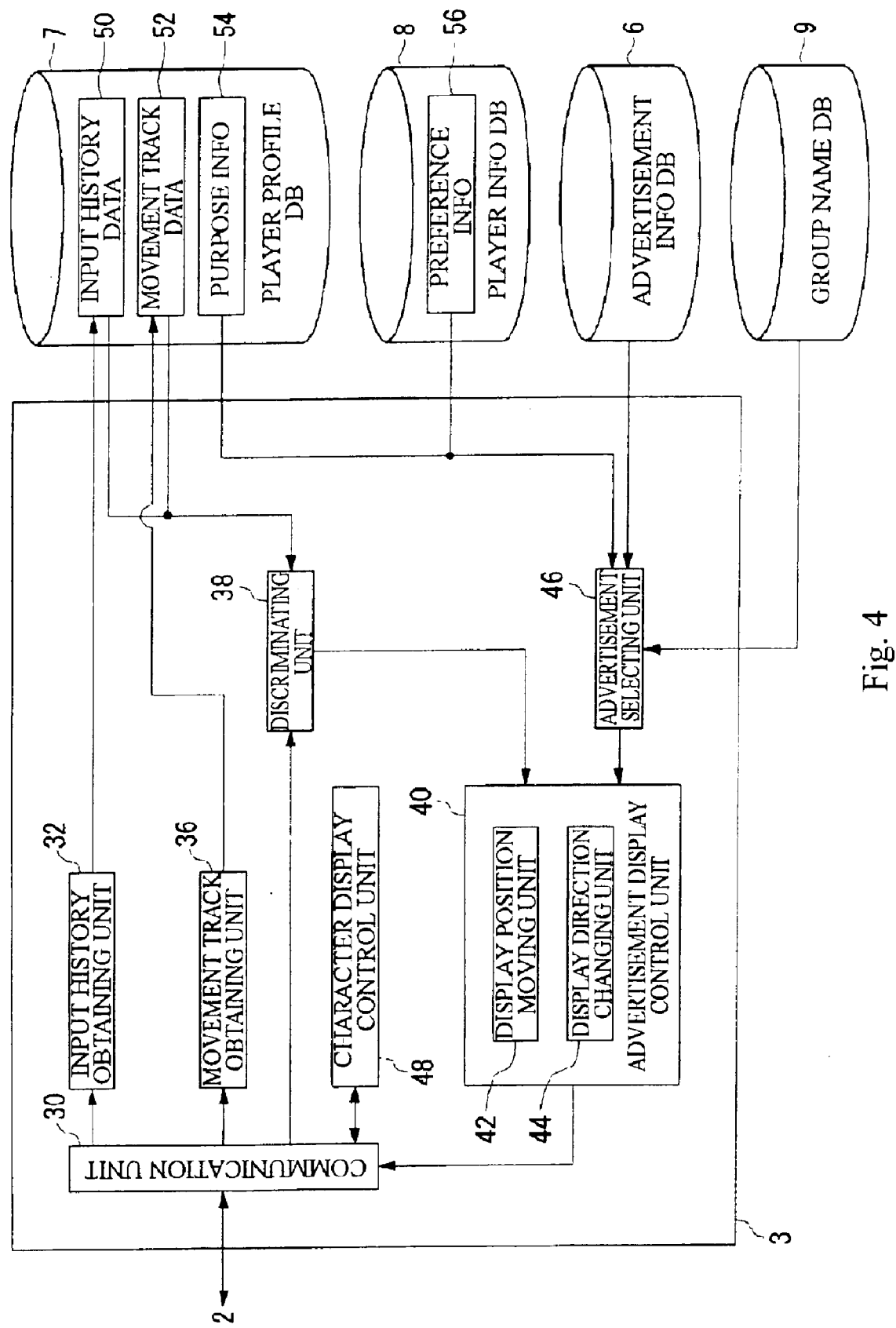
FIG. 4 shows a structure of the game server 3 of FIG. 1.

FIG. 4 shows a structure of the game server 3 according to Embodiment 1. The figure shows functions in blocks and these functional blocks can be realized by various modes such as hardware only, software only or a combination thereof. Hereafter referring to this block diagram, the processes on the game server 3 are explained.

Recording Movement Track and Input History

While a player can move a character and visual point in the virtual world by operating the controller 4, a communication unit 30 of the game server 3 receives from the client terminal 2 the coordinate value of the controller 4. For each player a movement track obtaining unit 36 detects the "movement track" which is the track of a player's character's movement in the virtual world resulting from the operation of the controller 4, and stores the movement track data 52 in the player profile DB 7. An input history obtaining unit 32 detects the "input history" which is a history of the operation positions of the respective directional-command buttons, 11a through 11d, for moving upward, downward, leftward, and rightward, or the analog operation units, 13R and 13L, and stores the input history data 50 in the player profile DB 7.

Figure 5:
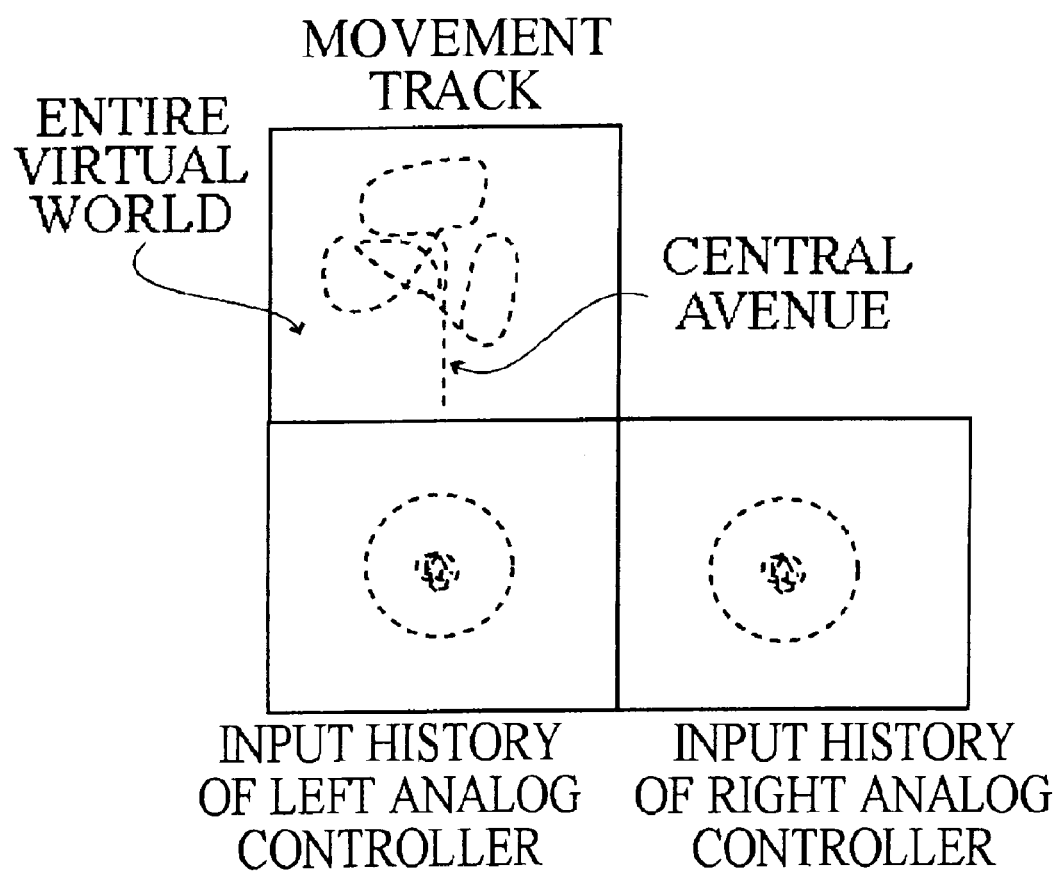
FIG. 5 shows one example of an input history and a movement track of the controller of FIG. 2, which are detected while the controller is being operated.
Figure 6:
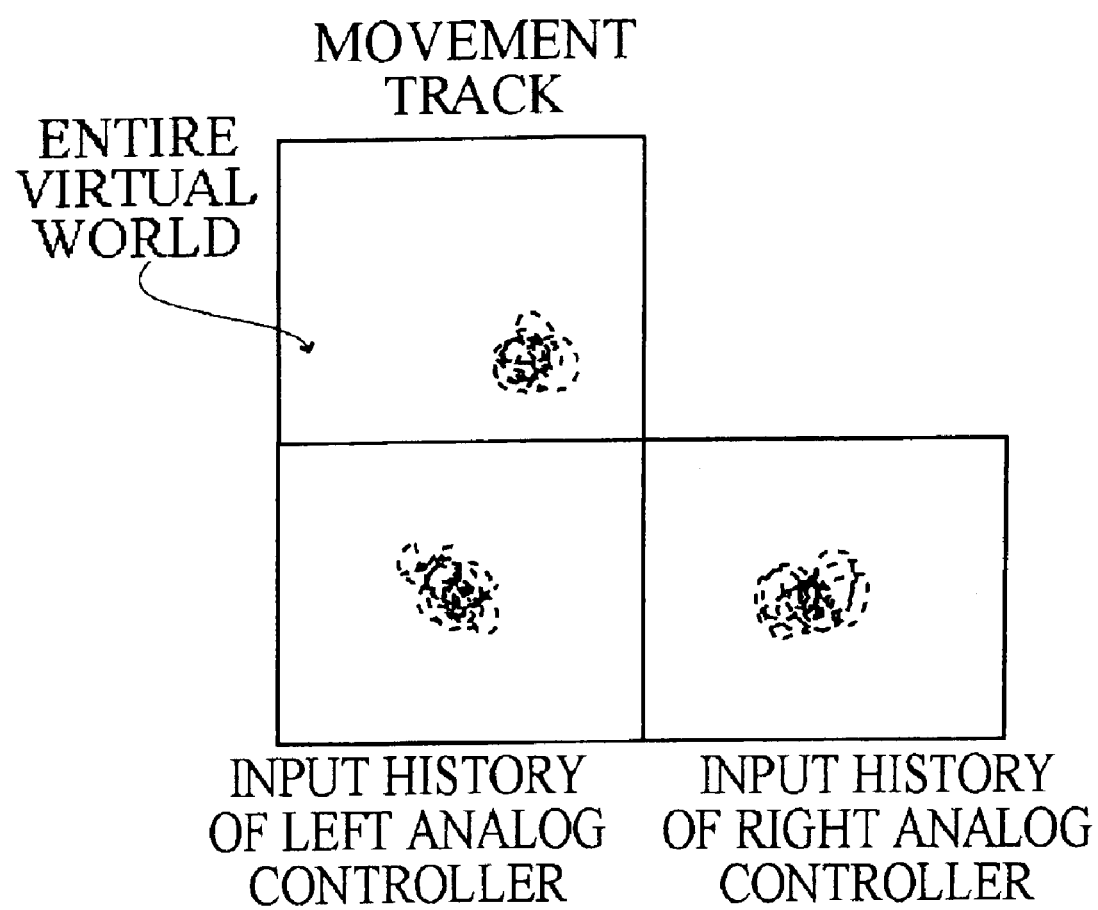
FIG. 6 shows another example of an input history and a movement track of the controller of FIG. 2, which are detected while the controller is being operated.

FIG. 5 shows an example of a "movement track" corresponding to the movement of Player A's character with commands given by the analog operation units, 13R and 13L, and the "input history" of the analog operation units, 13R and 13L. FIG. 6 shows an example of a "movement track" corresponding to the movement of Player B's character, with commands given by the analog operation units, 13R and 13L, and the "input history" of the analog operation units, 13R and 13L.

In the examples in FIG. 5 and FIG. 6, the upper left diagram shows the "movement track" of a character, the lower left diagram shows the "input history" of analog operation unit 13L, and the lower right diagram shows the "input history" of analog operation unit 13R.

The diagram of a "movement track" represents the entire area of the virtual world, and the movement track obtaining unit 36 stores in the player profile DB 7 the movement track data 52, which indicates the respective movement positions along the track on which the character moved, that is, according to the movement of analog operation units, 13R and 13L.

As described above, with the analog operation units, 13R and 13L, tilting and rotating from the home position are possible, and the input history obtaining unit 32 of the game server 3 stores in the player profile DB 7 the history of the operation position data as the input history data 50, which indicates the tilting and rotating positions of the analog operation units, 13R and 13L.

Thus, when the "movement track" and "input history" are stored for each player, it is possible to know the tendency of each player's "range of movement" and "speed of movement" in the virtual world. As described below, in the case of a network game system according to this embodiment, each player's "range of movement" and "speed of movement" are determined based on the "movement track" and "input history" stored in the player profile DB 7, and then the installation position and direction of a billboard object, on which such items as advertising of enterprises, etc. or important information from the system administrator is written, are adjusted to be displayed in the virtual world.

Billboard Display

Figure 7:
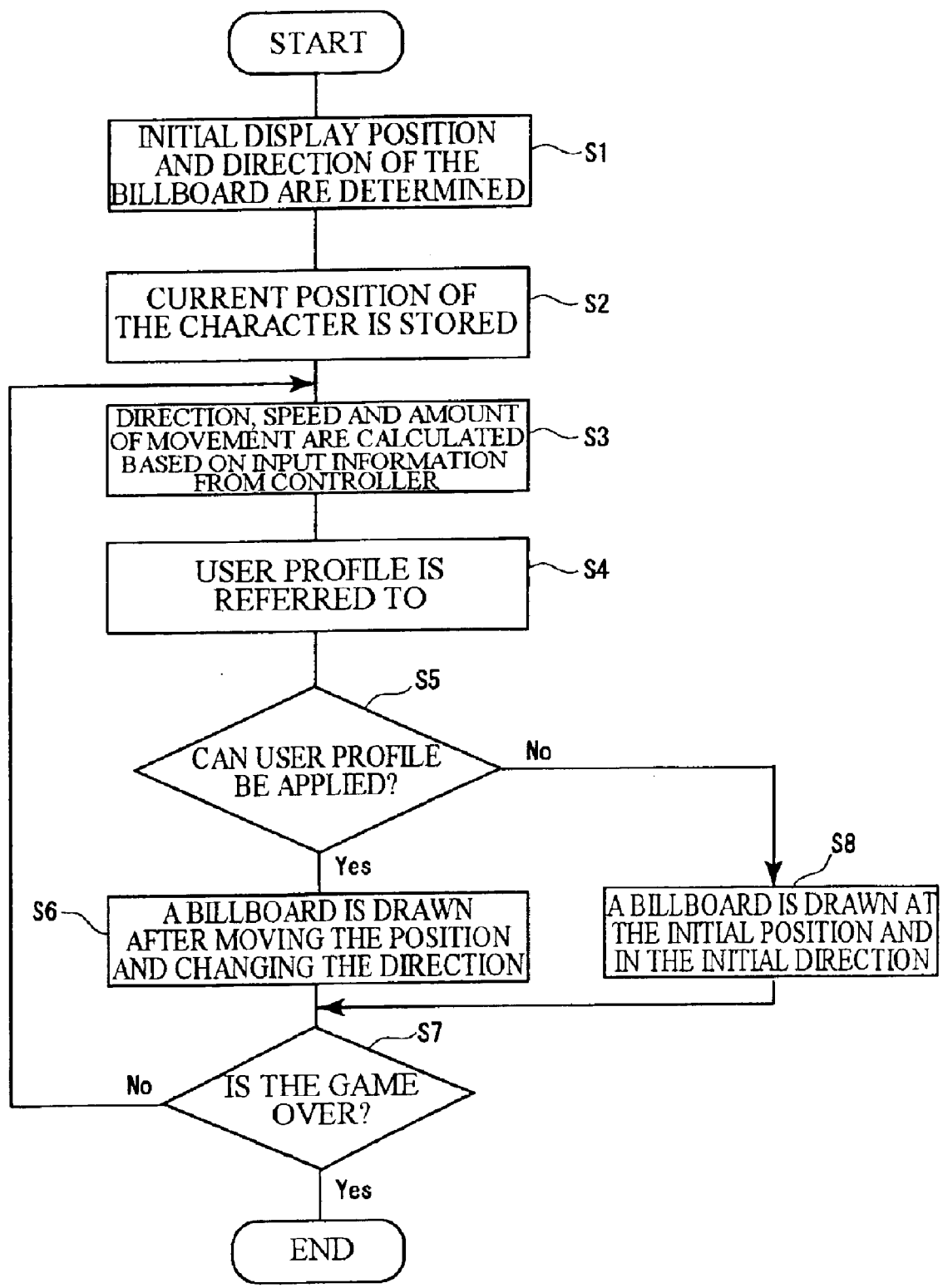
FIG. 7 is a flowchart which explains how the game server of FIG. 1 changes a display position and a display direction of a billboard in a virtual world according to an input history and a movement track of the controller 2 of FIG. 2.

The flowchart in FIG. 7 shows the flow of a billboard display process in a network game system according to Embodiment 1 (hereafter referred to as billboard display process). The billboard display process starts and proceeds to S1 when a virtual world and character images provided by the game server 3 are displayed on the monitor 5 connected to a player's client terminal 2 after a communication line between the player's client terminal 2 and the game server 3 is established.

In Step S1, the game server 3 determines the "initial display position" and "initial display direction" to display a billboard on which advertisement information stored in the advertisement information DB 6 or information from the system administrator to the player is to be written. Then, this billboard display process proceeds to Step S2.

In Step S2, the game server 3 stores the current position of the character in the virtual world or the position of a visual point. Then, this billboard display process proceeds to Step S3.

When the player moves a character in the virtual world by operating the directional-command buttons, 11*a* through 11*d*, for moving upward, downward, leftward, and rightward, or the analog operation units, 13R and 13L, on the controller 4, the coordinate values are supplied to the game server 3 from the controller 4 via the client terminal 2. In Step S3, a character display control unit 48 of the game server 3 calculates the "direction of movement," "speed of movement," and "amount of movement" of the character based on the coordinate values which are received as input from the controller 4.

Specifically, the tilt direction of the analog operation units, 13R and 13L, indicates the "direction of movement" of a character, and the tilt amount of the analog operation units, 13R and 13L, indicates the "speed of movement" of a character. For example, when the tilt amount of the analog operation units, 13R and 13L increases, the speed of movement of a character increases.

The character display control unit 48 of the game server 3 calculates the "amount of movement" of a character based on the "direction of movement" and "speed of movement" which are determined by the tilt direction and tilt amount of the analog operation units, 13R and 13L. It then forms image information about a character's movement based on "direction of movement," "speed of movement," and "amount of movement," and the communication unit 30 sends it back to the client terminal 2. This results in a moving character being displayed on the player's monitor 5 based on the operation of the player's controller 4.

Next, in Step S4, the discriminating unit 38 of the game server 3 refers to the "movement track" and "input history" of the player stored in the player profile DB 7, and in Step S5, determines whether or not the current position moved to by a player's character and the input state of the controller 4 reflect the "movement track" and "input history" of the player found in the player profile DB 7.

In other words, in Step S5, the discriminating unit 38 determines whether or not a character is moving along the "movement track" of the player stored in the player profile DB 7, and whether or not the controller 4 is being operated in a manner consistent with the "input history."

If a character is following a movement track which is different from the "movement track" of the player stored in the player profile DB 7, and the controller 4 is being operated in a manner which is inconsistent with the "input history," an advertisement display control unit 40 of the game server 3, in Step S8, displays a billboard advertisement of enterprises, etc. stored in the advertisement information DB 6 at the "initial display position" and in the "initial display direction," which were determined in Step S1 as described above.

On the other hand, the discriminating unit 38 determines that a character is moving along the "movement track" of the player stored in the player profile DB 7, and the controller 4 is being operated in a manner consistent with the "input history," the display position moving unit 42 of the game server 3, in Step S6, displays a billboard by moving the billboard to a position which corresponds to the "movement track" of the player's character stored in the player profile DB 7, and then adjusts the display direction so that in all probability it will be clearly visible from the position where the player is.

For example, in the diagram of the "movement track" of Player A shown in FIG. 5, when "Central Avenue" in the virtual world exists along the movement track which goes straight through approximately the mid-area of this diagram, it can be deduced that Player A often passes through "Central Avenue."

Further, as described above, the tilt amount of the analog operation units, 13R and 13L, on the controller 4 determines the speed of movement of a player's character, and in the diagram of the "input history" of Player A shown in FIG. 5 the input history is formed in circular shapes. This indicates that the analog operation units, 13R and 13L, have been tilted to the maximum amount. In other words, Player A's character frequently moves in the virtual world at a high speed.

Figure 8:
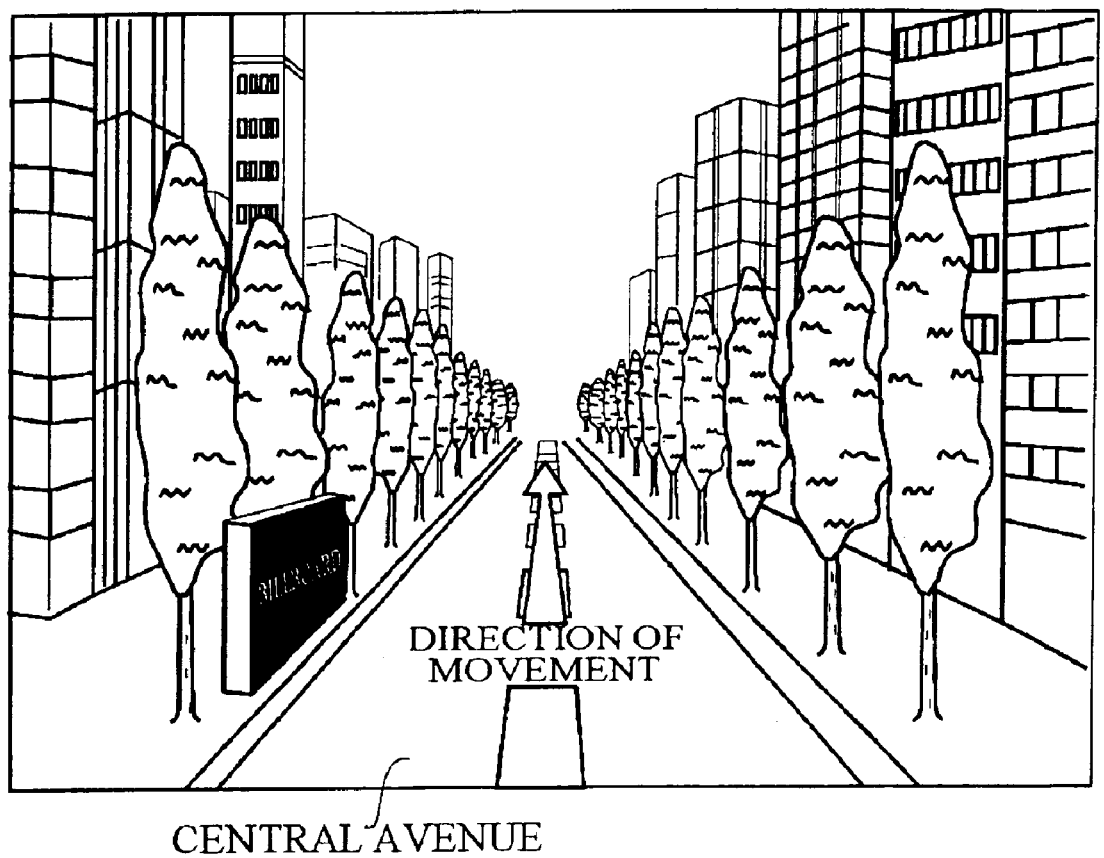
FIG. 8 shows a billboard before the game server of FIG. 1 changes its display position and display direction.
Figure 9:
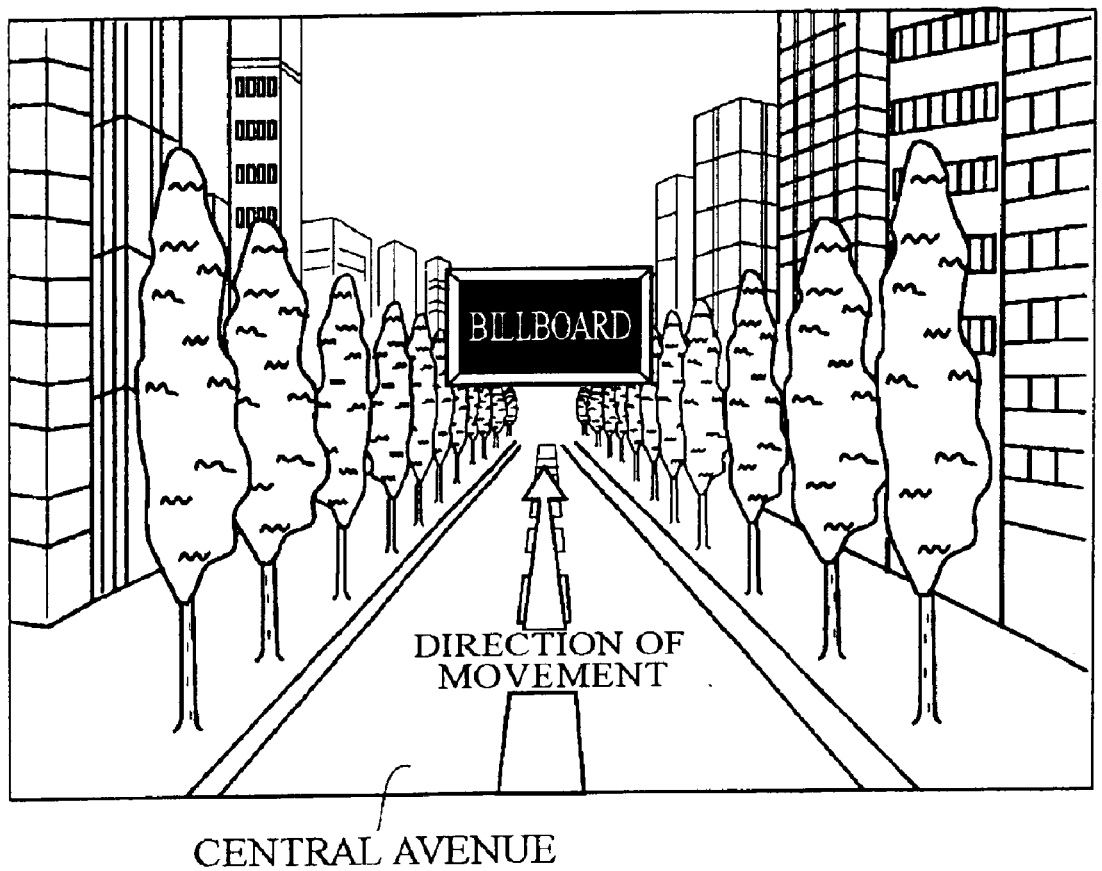
FIG. 9 shows a billboard after the game server of FIG. 1 changes its display position and display direction.

From the above, it can be deduced that Player A frequently moves through "Central Avenue" in the virtual world at a high speed. Therefore, as shown in FIG. 9, the advertisement display control unit 40 of the game server 3 will display a billboard in a position along the direction of movement of Player A's character and in such a way that the information display surface faces the direction of movement of the player's character. This billboard was initially planned to be displayed along Central Avenue in the "initial display position" and "initial display direction," which is shown in FIG. 8.

The billboard will in all probability be displayed in a position where Player A's character will pass by. Further, normally, the direction of a player's gaze is the same as the direction of movement of the character moving in the virtual world. Therefore, by controlling the display of a billboard in such a way that the display surface is facing the direction of movement of the player's character, the display contents displayed on the billboard will in all probability be viewable to the player.

In FIG. 6, with the approximate center of this diagram being the "Downtown Area" of the virtual world, from the diagram of the "movement track" of Player B, it can be deduced that Player B frequently moves around in a section away from the "Downtown Area."

Further, from the diagram of the "input history" of Player B shown in FIG. 6, it can be seen that the "input history" is concentrated in the center section. This indicates that the degree of tilt of analog operation units, 13R and 13L, is small and that Player B's character frequently moves in the virtual world at a low speed.

From the above, it can be deduced that Player B frequently moves around in a section away from the "Downtown Area" in the virtual world at a low speed. Therefore, in this case, the advertisement display control unit 40 of the game server 3 will display a billboard in a position away from the "Downtown Area" in the virtual world and in such a way that the information display surface is parallel to the direction of movement of Player B's character. This billboard was initially planned to be displayed in the "initial display position" and "initial display direction," as described above. In all probability the billboard will be displayed in a position where Player B's character will pass by and in all probability the display contents displayed on the billboard will be viewable to the player.

Such control of the display position and display direction of a billboard are repeatedly conducted in Step S7 of the flowchart shown in FIG. 7 until the game server 3 determines the video game to be complete.

In the case just described, the display position of an object like a billboard has been configured to reflect the "movement track" and "input history," however, it may be configured to reflect either only the "movement track" or only the "input history."

Display Change of Contents

The displayed contents of a billboard may be common among respective players, or, in the case of a network game system according to this embodiment, the displayed contents of a billboard can be varied according to various criteria such as a player's preference, a player's purpose of logging on the virtual world, or based on the area of the virtual world.

Changing the Contents to be Displayed According to a Player's Preference

When changing the contents to be displayed on a billboard based on a player's preference, the game server 3 checks the information each player submitted when they registered. This information will have been obtained via a web based questionnaire, a paper questionnaire, a telephone questionnaire, etc. The game server 3 further determines each player's preference from the movement track of each player in the virtual world and the trend of each player such as what stores in the virtual world have been visited. The preference information 56 which indicates each player's preference will have been stored as a piece of player information in the player information DB 8.

In addition, the game server 3 may be configured to store in the player information DB 8 the player information as the preference information 56, which indicates the advertisement contents designated by the player after the advertisement contents to be displayed in the virtual world is designated by the player via the network 1.

When a player logs into the virtual world, the advertisement selecting unit 46 of the game server 3 reads out the player information of this player from the player information DB 8, and reads out from the advertisement information DB 6 the advertisement information which corresponds to the player's preference which is indicated by the player information. Then, the advertisement display control unit 40 changes the contents of an object like a billboard, which is in the range viewable from the current position of the player, to correspond to the player's preference which was read out from the advertisement information DB 6 by the advertisement selecting unit 46 and displays them.

Figure 10:
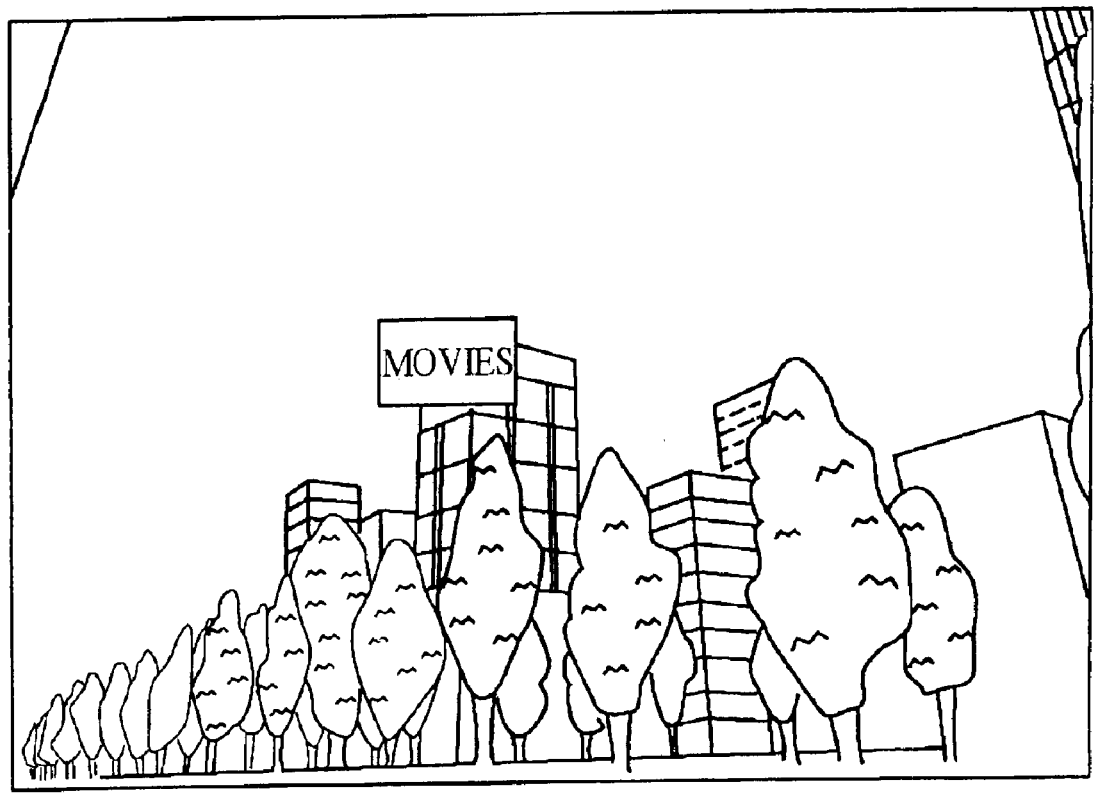
FIG. 10 shows a billboard after the game server of FIG. 1 changes its display content according to a player's preference.
Figure 11:
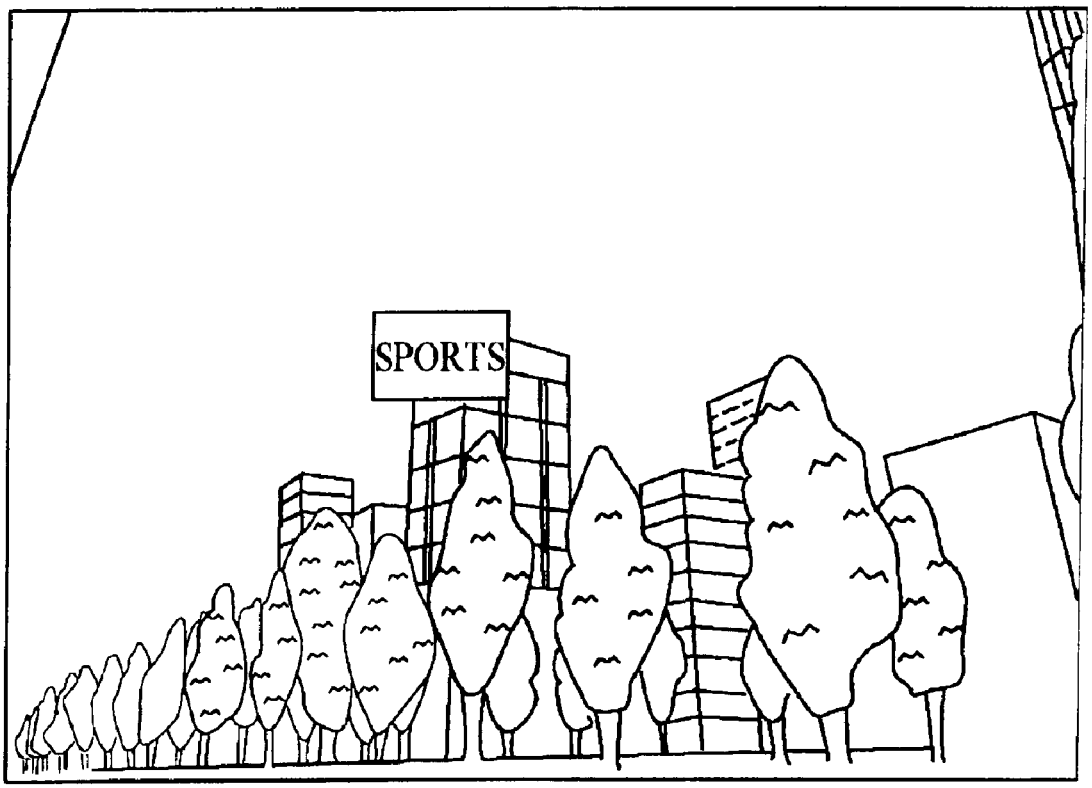
FIG. 11 shows a billboard after the game server of FIG. 1 changes its display content according to a player's preference.

FIG. 10 and FIG. 11 show an example of a streetscape in the virtual world displayed when Player A and Player B, who is independent from Player A, look in the same direction from the same position in the virtual world. For example, if Player A has a preference for "movie related" and Player B has a preference for "sports related," each player's preference will be reflected on the displayed contents of an object like a billboard, and as a result, on the billboard in the virtual world seen by Player A, a "movie related" advertisement will be displayed as shown in FIG. 10, and on the billboard in the virtual world seen by Player B, a "sports related" advertisement will be displayed as shown in FIG. 11.

Thus, by varying the advertisement contents to be displayed based on each player's preference, it is possible for each player to receive useful information which corresponds to their own preference from the advertisement on an object like a billboard in the virtual world.

Changing the Contents to be Displayed According to a Player's Purpose

When displaying on a billboard information such as an advertisement corresponding to a player's purpose of logging into the virtual world, the game server 3 displays on the monitor 5 via the player's client terminal 2 an input screen with an input field for the player's purpose when the player logs into the virtual world.

The player inputs in this field his/her login purpose such as "shopping", "participating in an event to be held in the virtual world", "meeting a friend's character", and so on. When the purpose is input, the game server 3 obtains the player's login purpose from the data input in the field and stores the purpose information 54, which indicates the player's login purpose, in the player profile DB 7.

When the player logs into the virtual world, the advertisement selecting unit 46 reads out the advertisement information corresponding to the player's purpose from the advertisement information DB 6, and the advertisement display control unit 40 displays the advertisement information on a billboard which is installed in a position close to the player in the virtual world.

Thus, it is possible to display a useful advertisement fit for the player's login purpose and thereby a product and an invent can be efficiently advertised to only players who might take an interest in such information.

In addition, the game server 3 charges the advertiser a higher advertisement fee than usual when selectively displaying an advertisement for a player. In this case, because a player who sees the advertisement will take an interest in the advertisement, the advertiser can attain significant advertising impact consistent with the charged advertisement fee.

It is to be noted that the game server 3 displays a predefined advertisement when the player's login purpose cannot be obtained and charges on the displayed advertisement.

Changing the Contents to be Displayed According to an Area

The example given above was an example of changing the contents to be displayed on an object like a billboard based on a player's preference. It is also possible to have the contents to be displayed on an object like a billboard changed based on the area in the virtual world.

More specifically, in this case, the advertisement selecting unit 46 of the game server 3 virtually divides the entire virtual world into separate areas, and distributes the advertisement contents to be displayed on the billboards installed in each area. For example, if there are many movie related businesses such as movie theaters and character good stores in Area No. 1, an advertisement with movie related contents is displayed, and if there are many sports related businesses in Area No. 2, an advertisement with sports related contents is displayed.

The discriminating unit 38 of the game server 3 monitors the current position of the player who logged into the virtual world. If the discriminating unit 38 determines that the player moves to Area No. 1, the advertisement selecting unit 46 selects a movie related advertisement on the billboard as shown in FIG. 10 and the advertisement display control unit 40 controls displaying the advertisement on the client terminal 2. If the discriminating unit 38 determines that the player moves to Area No. 2, the advertisement selecting unit 46 selects a sports related advertisement on the billboard as shown in FIG. 11 and the advertisement display control unit 40 controls displaying the advertisement.

In this case, players who are in the same area will see an advertisement with the same contents regardless of their preference. However, by standardizing the advertisement contents for each area, it is possible to have players recognize the characteristics of an area like there being many sports related businesses in the area.

Changing the Contents to be Displayed According to the Time of Day

In the cases above, it has been described how the advertisement contents to be displayed on a billboard can be changed according to either a player's preference or based on the area in the virtual world where a player is. It is also possible to vary advertisement contents on an object like a billboard based on "Time." For example, a sports related advertisement will be displayed from 8:00 a.m. to 11:00 a.m., a food related advertisement will be displayed from 11:00 a.m. to 2:00 p.m., and a movie related advertisement will be displayed from 2:00 p.m. to 6:00 p.m.

Thus, even within the same area in the virtual world, the advertisement contents displayed on an object like a billboard will be changed based on the time, which provides the players with additional fun in exploring the virtual world.

Display Control of Such Information as an Advertisement Targeting a Group of Players With a network game system according to this embodiment, as described above, it is possible to display an object like a billboard with various advertisement information tailored for respective players. However, if the advertisement information is varied per player when multiple players have simultaneously logged into the virtual world as a group, even when the players in the group look at the same billboard in the virtual world, each player will see different information.

Figure 12:
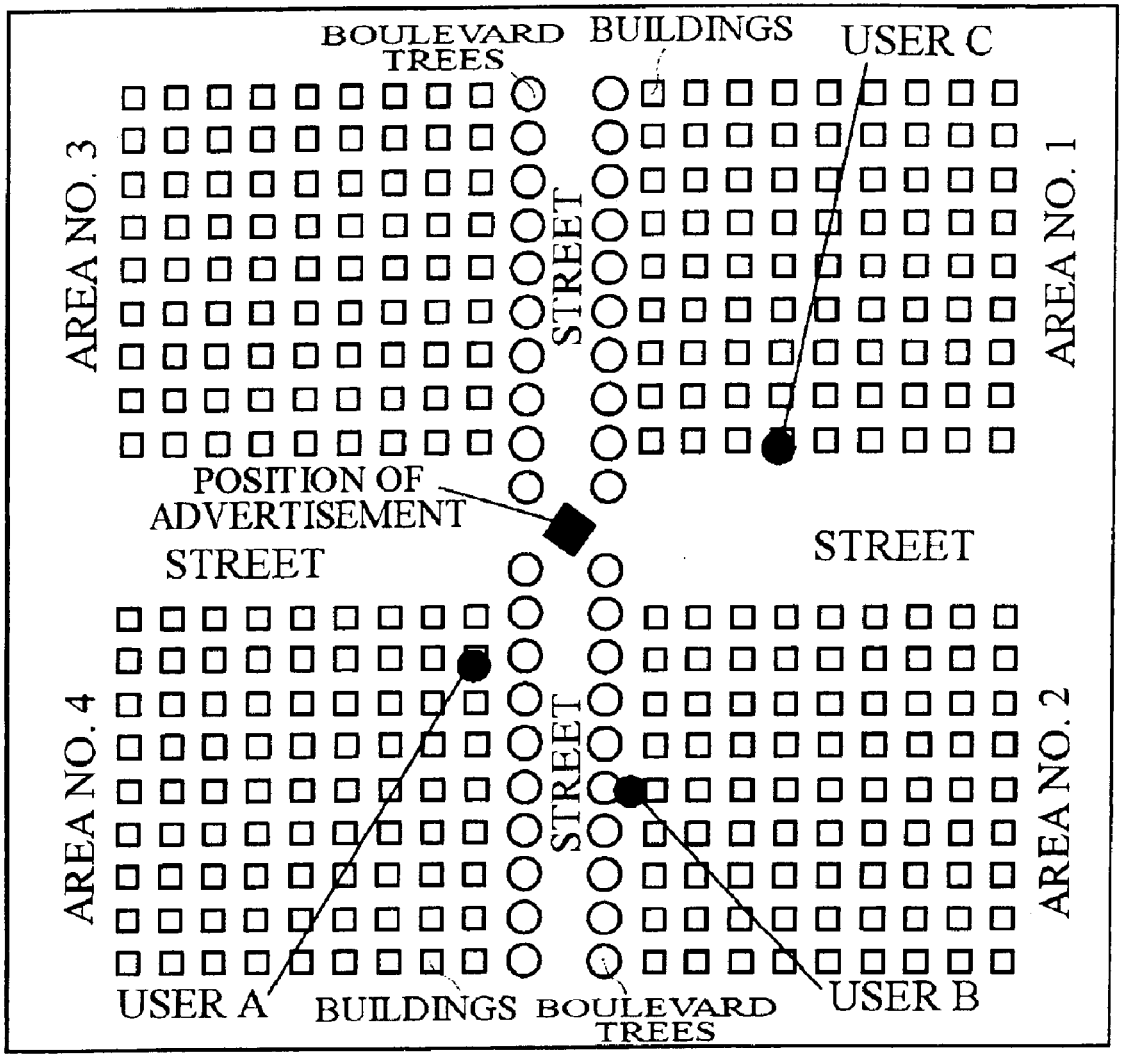
FIG. 12 shows a positional relationship of players who log into a virtual world as the same group.

FIG. 12 is a two-dimensional diagram which shows the current positions of Players A through C in the virtual world and the position where a billboard is installed or the position of an advertisement from a bird's-eye view looking down upon the entire virtual world. The entire virtual world is divided equally into 4 sections, Area No. 1 through No. 4, by 2 straight streets which are laid out to each run through the center of the virtual world and run at right angles to one another. The ranges of the respective areas No. 1 through No. 4 are described with square-shaped symbols which represent buildings, and circle-shaped symbols placed along the sides of a street represent boulevard trees. At the center of the intersection, a billboard displaying an advertisement with designated contents is installed.

In the example in FIG. 12, Player A and Player B have logged into the virtual world as a group. If Player A's current position is in Area No. 4 and Player B's current position is in Area No. 2, and they communicate with each other by each looking at and referring to the billboard installed at the intersection, they will end up having a disjointed conversation, with for example, Player A saying "There is a billboard with sports related information, isn't there?" and Player B responding "No, isn't it a billboard with movie related information?"

Therefore, in a network game system according to this embodiment, when multiple players log into the virtual world as a group, by displaying billboards with common contents for the players who form a group, regardless of each player's preference or the area they are in, the kind of problem mentioned above of having a disjointed conversation can be prevented.

Logging into the Virtual World as a Group

Figure 13:
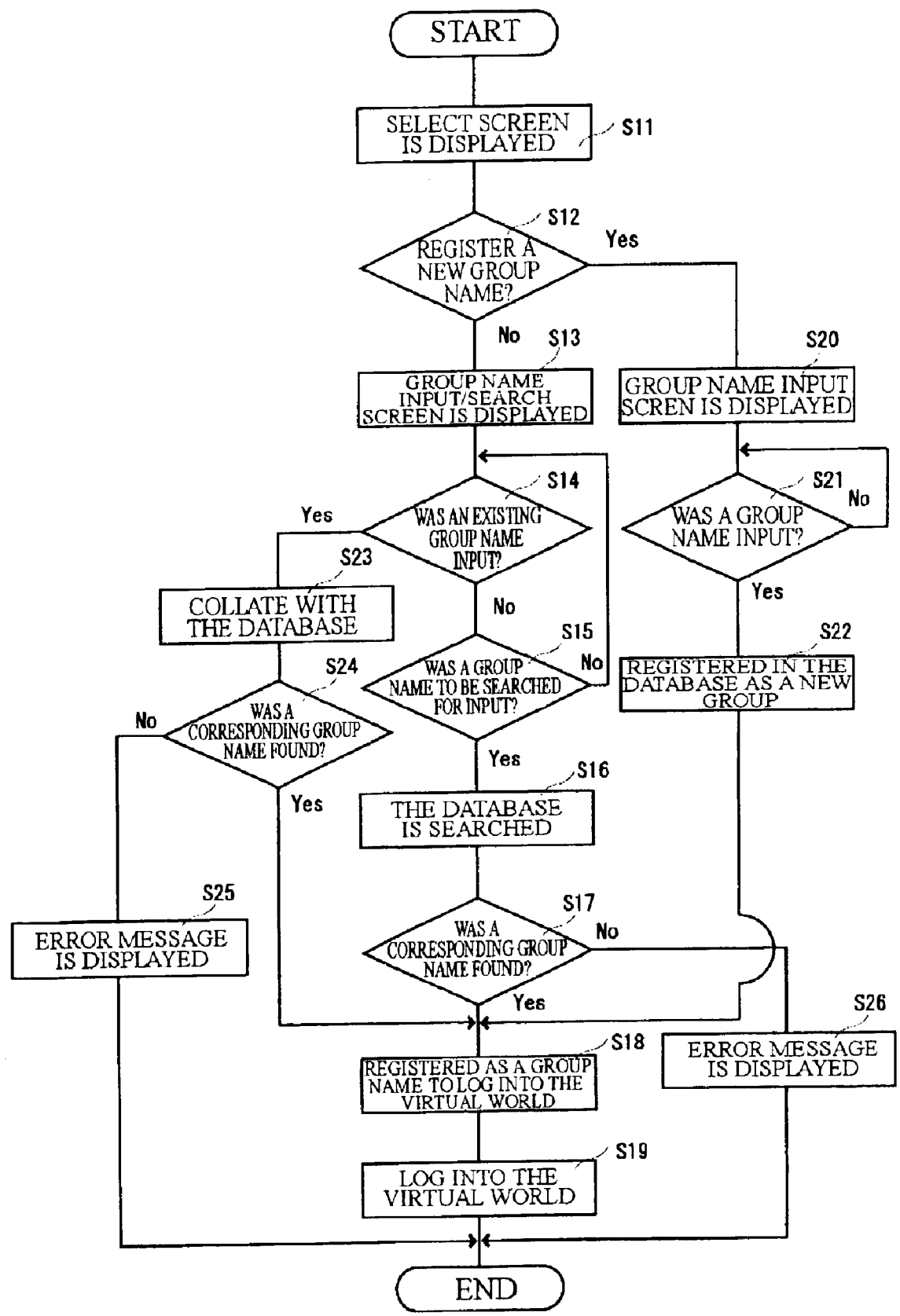
FIG. 13 is a flowchart showing a login procedure of the game server of FIG. 1 when a player logs into a virtual world as a group.

Here, while making reference to the flowchart shown in FIG. 13, the operation of the game server 3, when a group of players log into the virtual world, will be described. When a player attempts to access the game server 3, a select screen to log into the virtual world either as an individual or as a group is sent from the game server 3 to the player's client terminal 2. If the player selects "login as a group" on the select screen, the process described in the flowchart shown in FIG. 13 starts and the group login process proceeds to Step S11.

In Step S11, since the player has selected the group login, the game server 3 displays a select screen with options to login by registering a new group name or to login with a registered group name on the player's client terminal 2. In Step S12, the game server 3 determines whether or not login has taken place by registering a new group. If login by registering a new group name has been selected, the login process proceeds to Step S20. If login with a registered group name has been selected, the login process proceeds to Step S13.

When the login process proceeds to Step S20, the game server 3 displays a screen to input the group name to be newly registered on the player's client terminal 2 and, in Step S21, waits for a group name to be newly registered to be input. When a group name to be newly registered is input, the login process proceeds to Step S22. In Step S22, the group name input is stored in the group name DB 9, and the login process proceeds to Step S18.

If in Step S12 "login with a registered group name" is selected, the login process proceeds to Step S13, and the game server 3 displays on the monitor 5 connected to the player's client terminal 2 a screen with two input fields: one for a registered group name and the other for a registered group name for which a search is required. In Steps S14 and S15, the game server 3 determines which of the two fields has been used to input a registered group name. If the filed for a registered group name has been used, the login process proceeds to Step S23, and if the field for a registered group name to be searched is used, the login process proceeds to Step S16.

In Step S23, the game server 3 collates the registered group name input with the group names registered in the group name DB 9 shown. In Step 24 the game server 3 determines whether a corresponding group name exists or not. When the registered group name input is found in the group name DB 9, the login process proceeds to Step S18. When the registered group name input is not found in the group name DB 9, it proceeds to Step S25, and an error message like "The group name input is not found," is displayed on the monitor 5 connected to a player's client terminal 2, and the login process is terminated.

In Step S16, the advertisement selecting unit 46 of the game server 3 searches for a group name in the group name DB 9 for which a search request has been made. In Step S17, the advertisement selecting unit 46 determines whether or not the corresponding group name searched for exists among the group names registered in the group name DB 9. If a corresponding group name is found, the login process proceeds to Step S18. If no corresponding group name is found it proceeds to Step S26, and an error message like "The group name which corresponds to the group name input is not registered," is displayed on the monitor 5 connected to the player's client terminal 2 and the login process is terminated.

Next, once the game server 3 registers in the group name DB 9 a new group name input in Step S22, or detects that the group name input in Step S24 exists in the group name DB 9, or detects that the group name to be searched for exists in the group name DB 9, in Step S18, the game server 3 stores in a storage media like semiconductor memory or hard disk the group name to be used for the player to log into the virtual world. In Step S19, the game server 3 allows the player to login by this group name stored in the storage media, and the login process is complete.

Thus, when multiple players who form a group, login to the virtual world, the game server 3 monitors the action of each player in this group based on the group name stored in the storage media mentioned above, and the advertisement selecting unit 46 selects billboard contents so that there will be no inconsistency arising among the players who belong to the same group and the advertisement display control unit 40 controls display of the selected contents on the client terminal 2.

Figure 14:
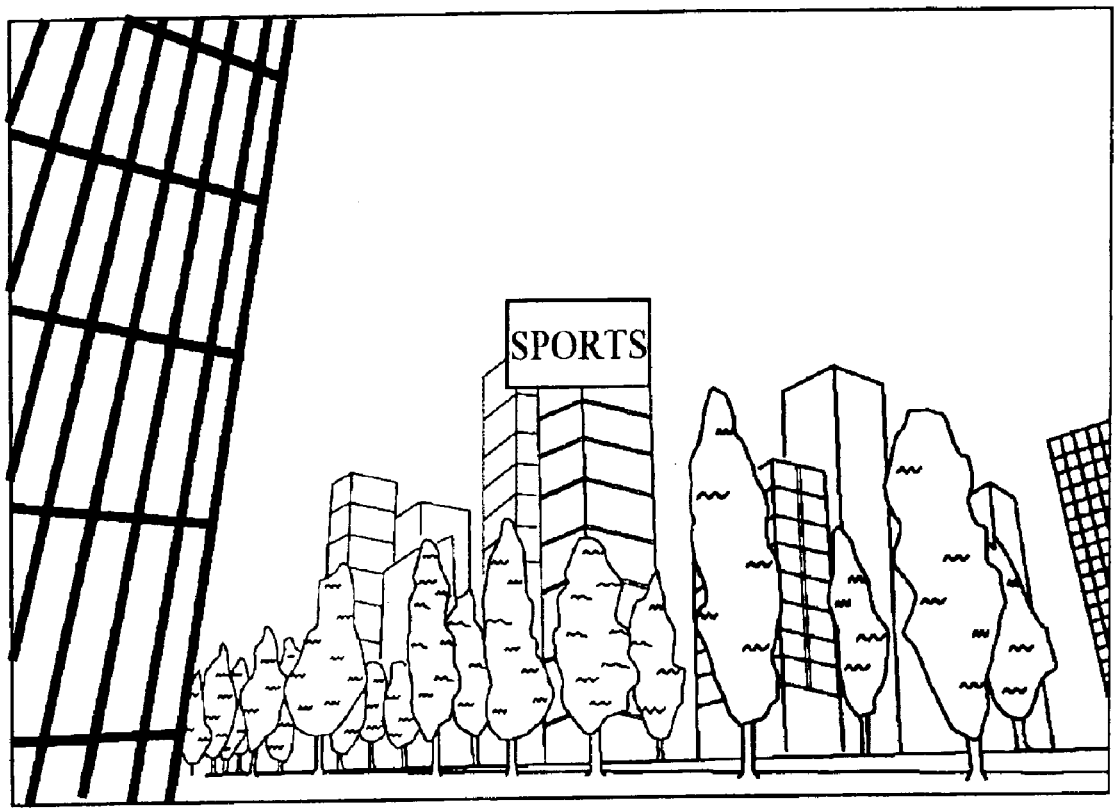
FIG. 14 shows a billboard in a virtual world which is viewed by players who belong to one group.
Figure 15:
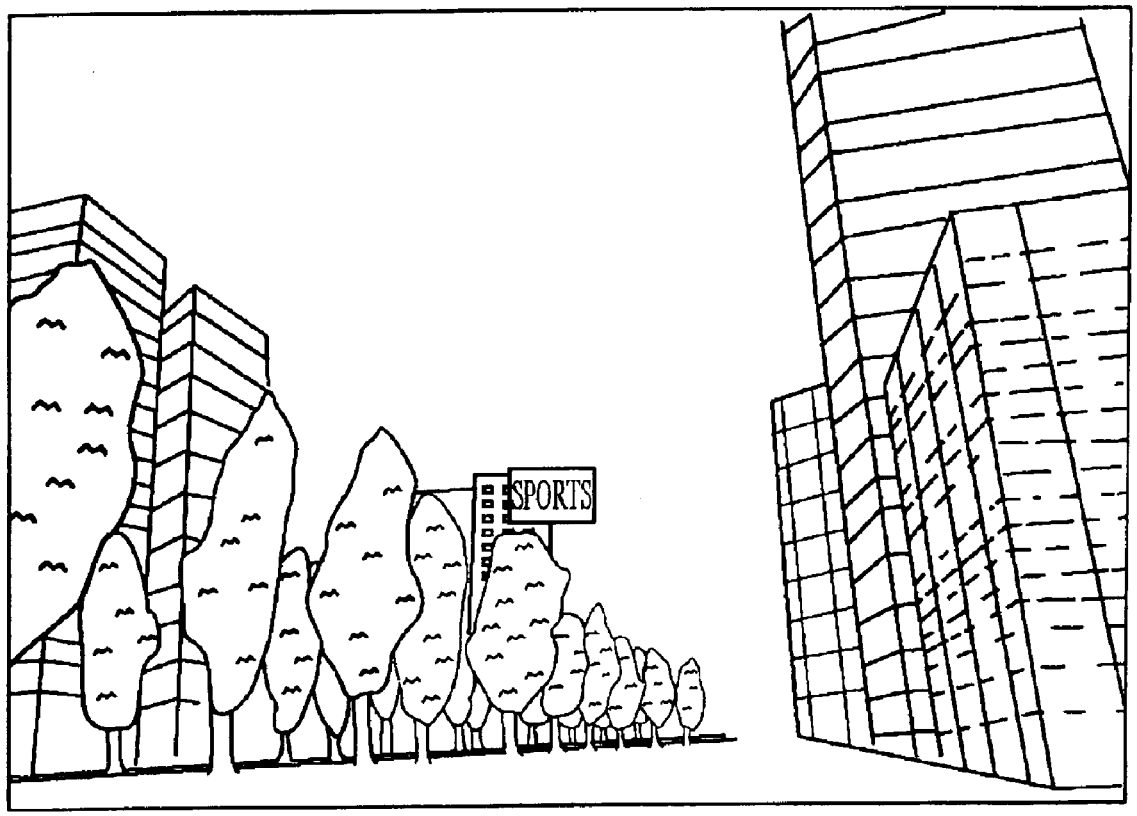
FIG. 15 shows a billboard in a virtual world which is viewed by players who belong to one group.
Figure 16:
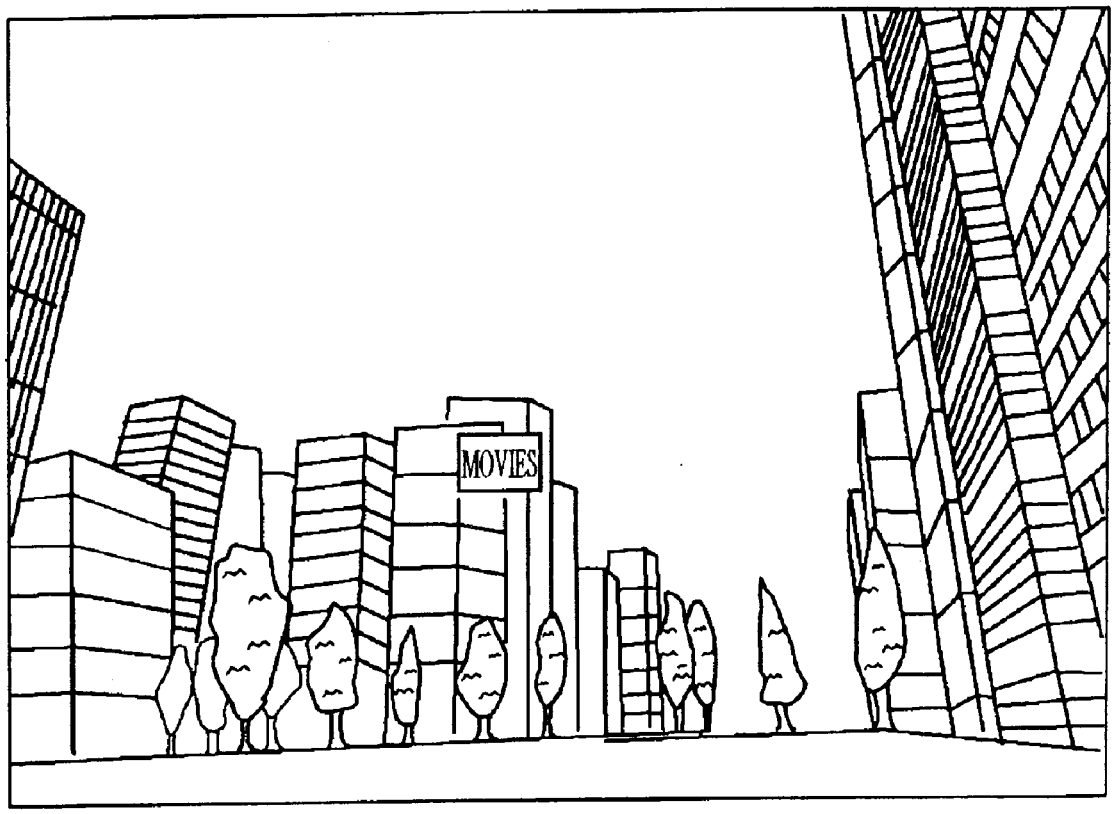
FIG. 16 shows a billboard in a virtual world which is viewed by a player who belongs to another group or a player who logs individually.

For example, FIG. 14 is a diagram showing a how a billboard installed at an intersection is seen by Player A from Area No. 4 in the virtual world. FIG. 15 shows a diagram of how the same billboard installed at the intersection is seen by Player B from Area No. 2 in the virtual world. Players A and B belong to a group as previously described when explaining FIG. 12. FIG. 16 is a diagram of how the billboard installed at the same intersection is seen by Player C from Area No. 1. Player C logged into the virtual world independently.

As shown in FIG. 14 and FIG. 15, the advertisement display control unit 40 controls the display of the billboard contents to be consistent between Player A and Player B who logged into the virtual world as a group. In this example, a billboard with sports related information is displayed. Meanwhile, as shown in FIG. 16, for Player C who logged into the virtual world as a player of a different group or independently, the advertisement selecting unit 46 selects the billboard contents to correspond to that player's preference as described above and the advertisement display control unit 40 controls display of the billboard contents on the client terminal 2. In this example, a billboard with movie related information is displayed.

While the basic configuration is to have the contents of a billboard advertisement reflect an individual player's preference, in the case of a group it is possible to display a billboard with the same contents. In this way, when the players who belong to the same group are looking at the same billboard, such an inconvenience as the occurrence of a disjointed conversation regarding the contents of that billboard can be prevented.

In addition, as described with reference to the flowchart in FIG. 13, group registration can be done beforehand upon logging into the virtual world, however, it is also possible for group registration be done after players have logged into the virtual world, so that players who are acquainted with one another in the virtual world can form a group and explore the virtual world as a group. Further, in regard to a group name, the same group name may be repeatedly used, or a group name may be changed every time when logging into the virtual world. The group name can also be changed after logging into the virtual world.

As seen in the above explanation, in a network game system according to Embodiment 1, the "movement track" of each character in the virtual world and the "input history" of the controller 4 are stored for each player, and by referencing the "movement track" and "input history" the display position and display direction of an object like a billboard in the virtual world can be determined so that there is the highest probability that a player will view the displayed contents of an object like a billboard in the virtual world.

When the basic configuration is to have the contents of a billboard advertisement reflect an individual player's preference, by displaying a billboard with the same contents for the respective players who belong to the same group, when the respective players who belong to the same group are looking at the same billboard, an inconvenience such as the occurrence of a disjointed conversation regarding the contents of that billboard can be prevented.

Embodiment 2

Next, a network game system according to Embodiment 2 of the present invention will be described. In the description of Embodiment 1 as described above, the display position and display direction of an object like a billboard are to reflect the "movement track" and "input history" of each player. Meanwhile, a network game system according to Embodiment 2 is configured so that the "movement track" of each player is statistically evaluated and based on that the value each player would give for the land in the virtual world is determined.

This is the only point of difference between Embodiment 1 previously described and Embodiment 2. Therefore, hereafter, only the differences between these two embodiments will be described and repetitive descriptions will be omitted.

Figure 17:
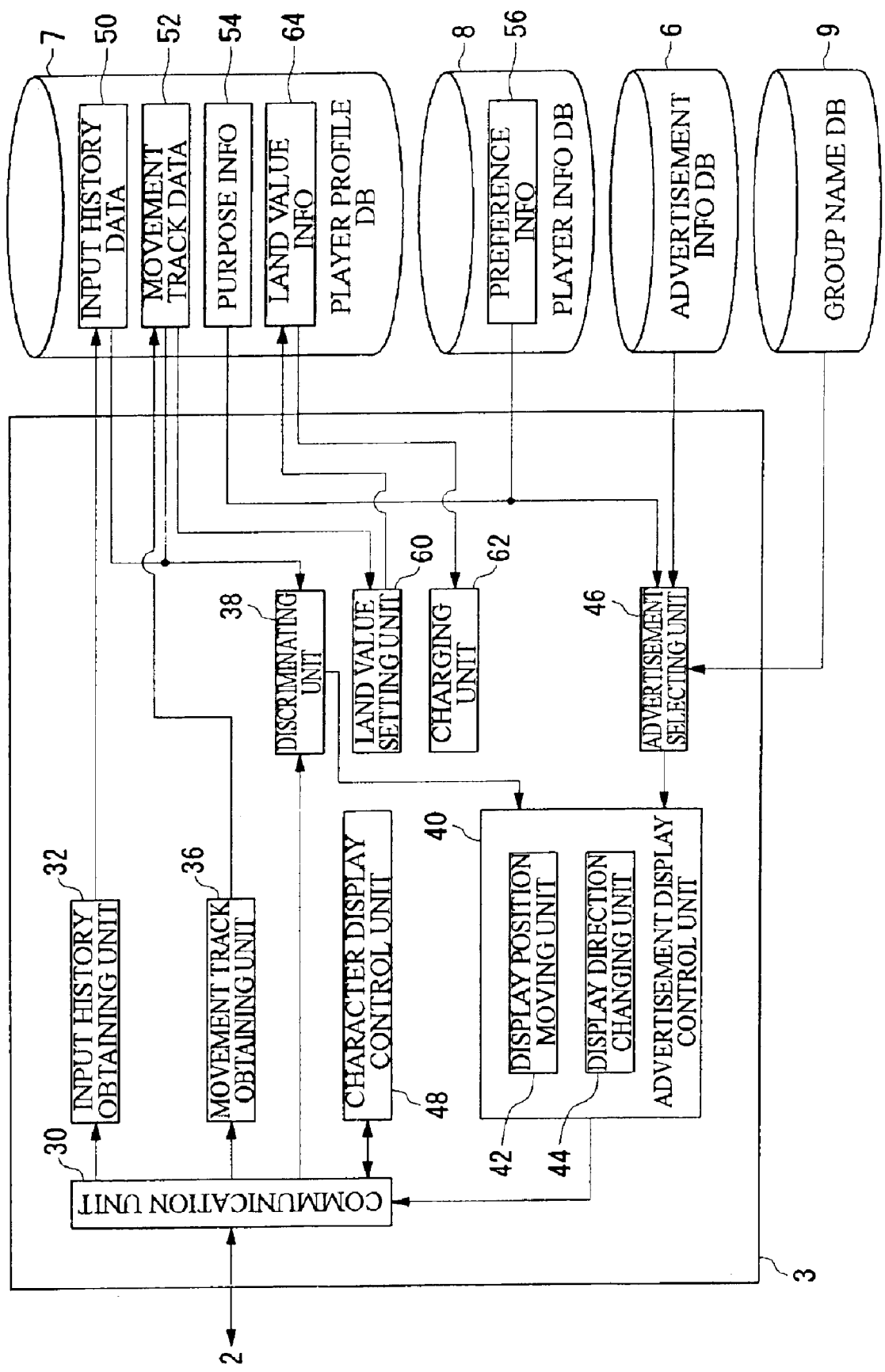
FIG. 17 is a block diagram of a game server according to Embodiment 2.

FIG. 17 is a block diagram of the game server 3 according to Embodiment 2. Hereafter referring to this block diagram, the processes on the game server 3 are explained.

General Concept in Regard to Land Value

Figure 18:
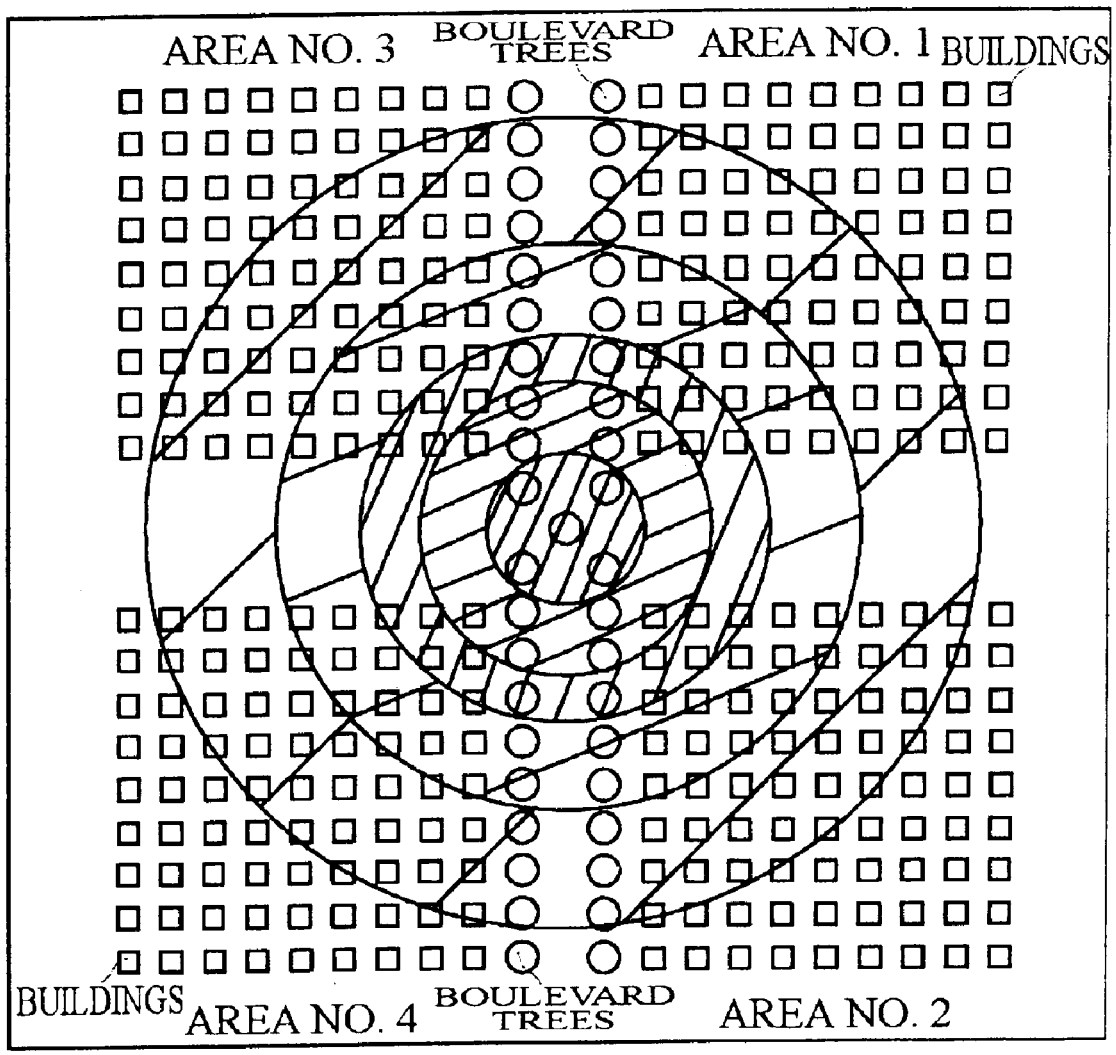
FIG. 18 shows a general land value distribution in a virtual world.
Figure 19:
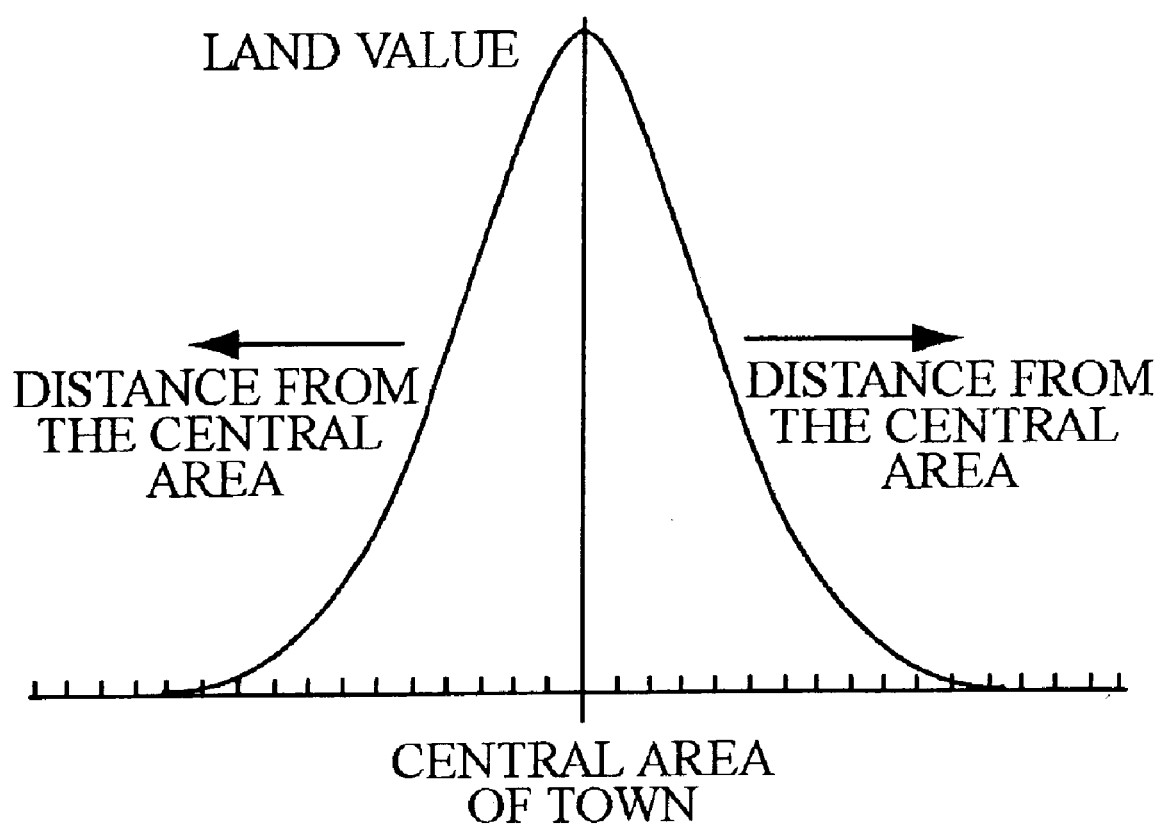
FIG. 19 shows a relationship between a distance from a central area of a town in a virtual world and a land value.

First, FIG. 18, just as FIG. 12, is a diagram of a bird's-eye view when looking down upon the entire virtual world. The concentric circles shown in FIG. 18, which expand outward from the center intersection, indicate land value ranges. Generally, as seen by these circles, the land value increases in the central area of town, which in this example is the vicinity of the intersection where the level of human traffic and the number of businesses are higher which enhances the convenience. The land value gradually decreases when getting farther away from the central area. FIG. 19 is a graph of the value distribution of such land values.

Sense of Land Values which Varies by Player

Figure 20:
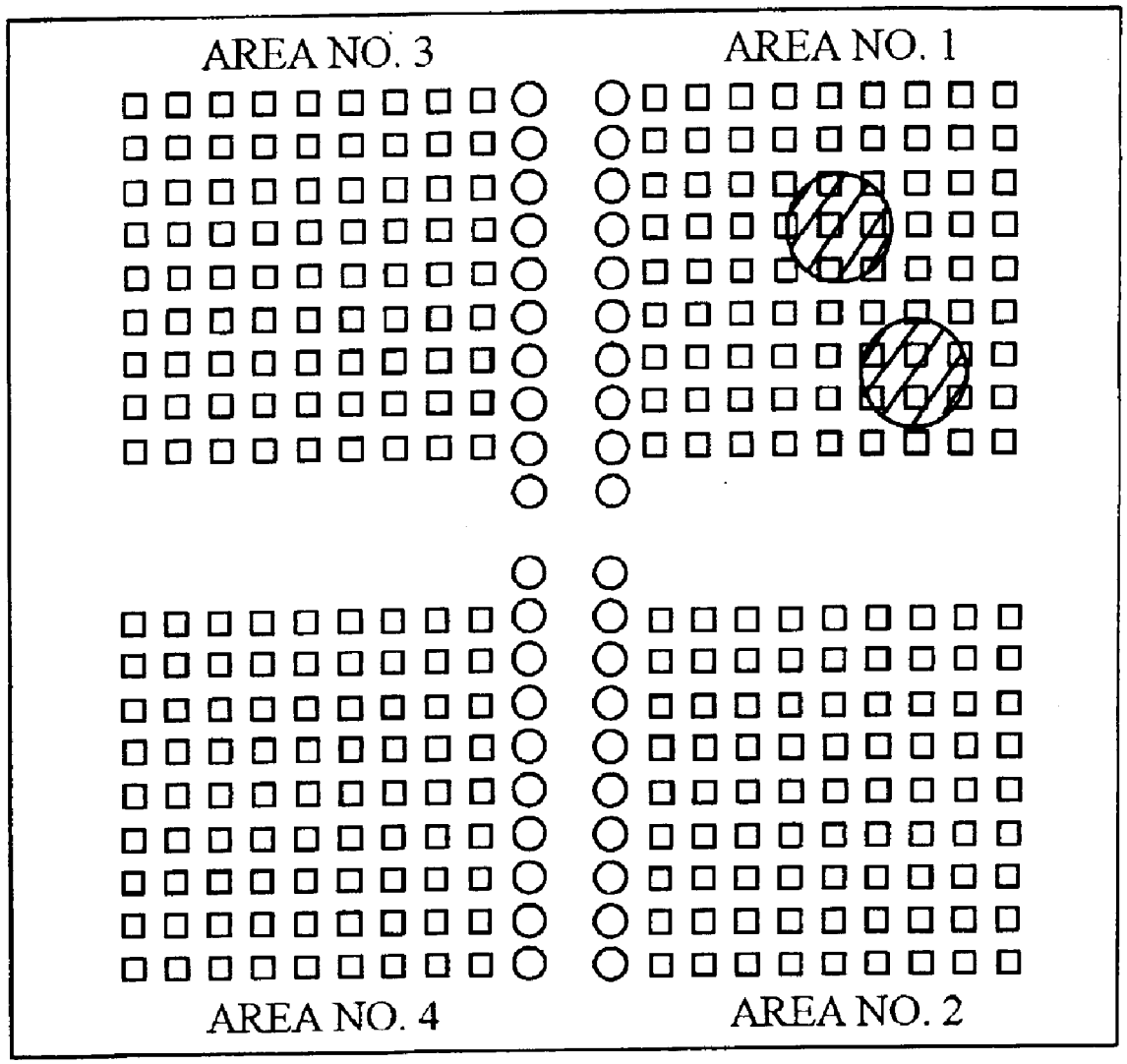
FIG. 20 shows an area which a player frequently visits judged from the player's movement track.

The sense of land value varies by player. In FIG. 20 the circles with diagonal lines inside indicate the movement track of Player A. From FIG. 20, it can be deduced that Player A frequently visits certain parts of Area No. 1 in the virtual world. Therefore, the part of Area No. 1 indicated by the circles in FIG. 20 can be judged to be valuable land to Player A.

Figure 21:
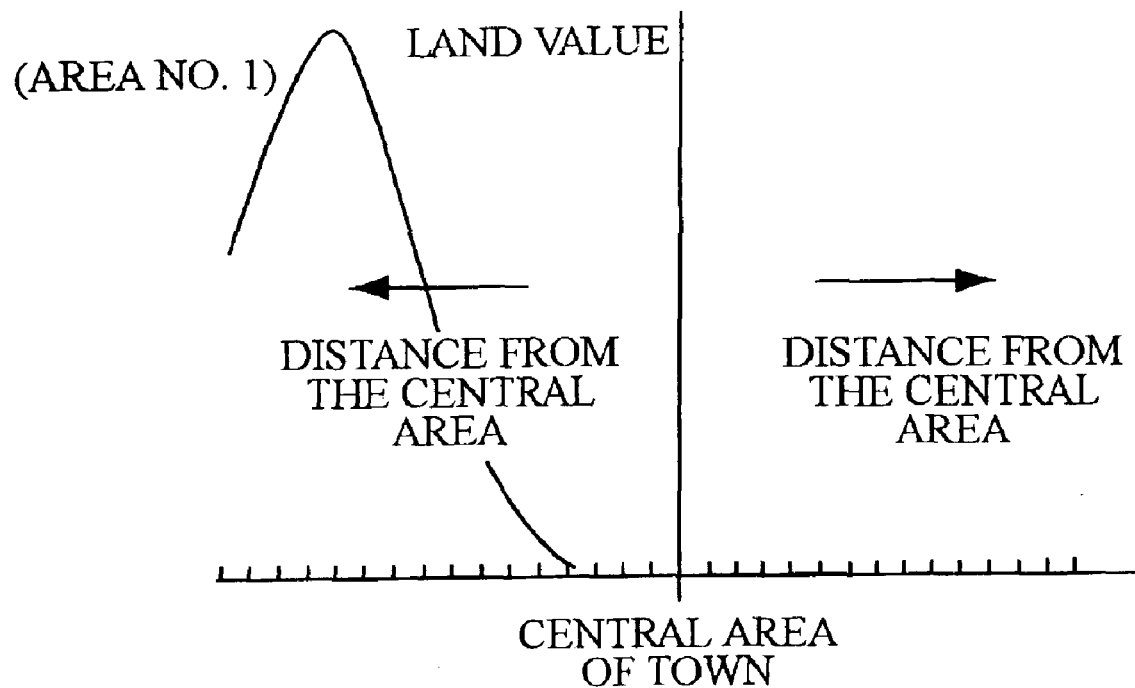
FIG. 21 is a graph of a land value for a player judged from the player's movement track.

FIG. 21 is a graph of the value distribution corresponding to the sense of land value by Player A. In the graph in FIG. 21, the vertical axis indicates the land value and horizontal axis indicates the distance from the central area of town. The peak land value falls in Area No. 1 where Player A frequently comes and goes.

Determining the Land Value per Player by Taking into Account their Movement Track When receiving a request from a player, for example, "I want to open a store in the virtual world" or "I want to build some architectural structure such as a house or building," the land value setting unit 60 of the game server 3 references the movement track of the player making the request in the player profile DB 7 and levies a fee upon the player's store or building, etc. by applying a value distribution which is based on a combination of the value distribution of general land values described in FIG. 19 and the value distribution of player's land values with reference to FIG. 21.

Figure 22:
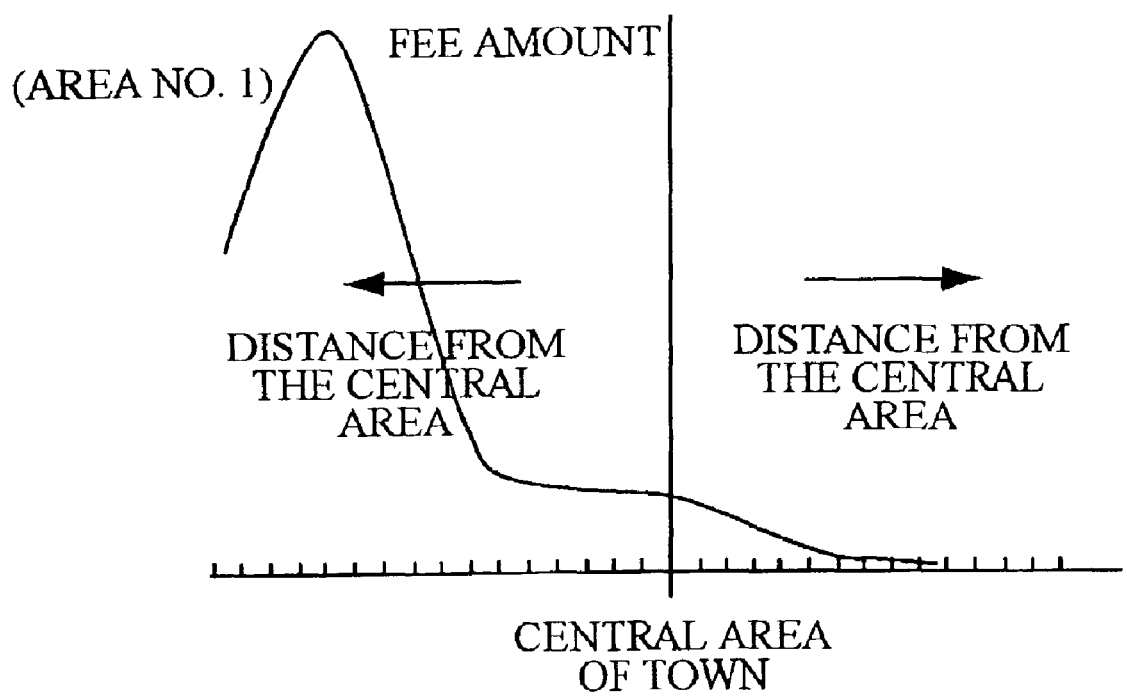
FIG. 22 is a graph of a land value for a player which is determined based on the player's movement track and a general land value in a virtual world.
Figure 23:
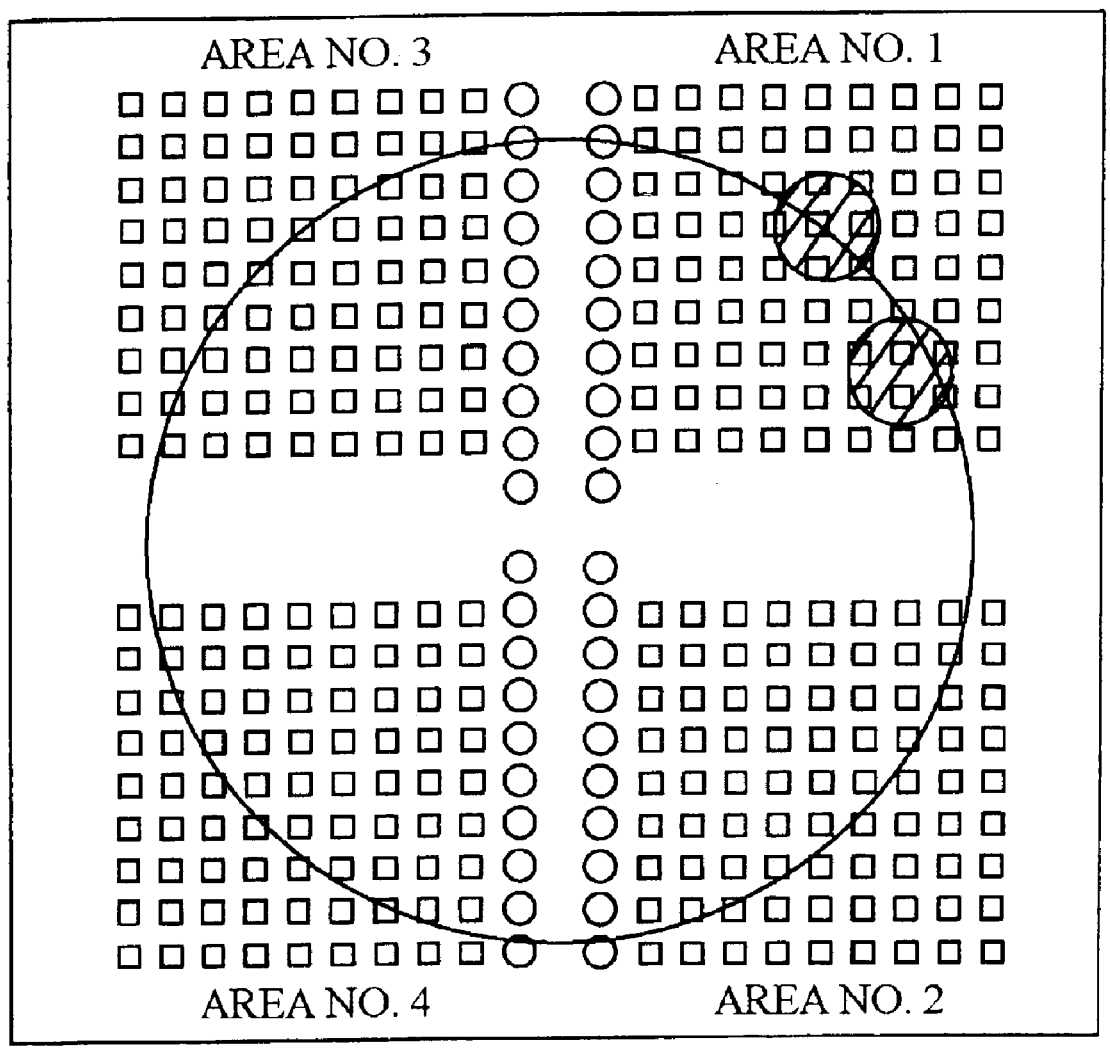
FIG. 23 shows a general movement range of players and a specific movement range corresponding to a movement track of a certain player.

FIG. 22 is a graph showing the relationship between location and fee amount in regard to Player A. FIG. 23 is a pattern diagram from a bird's-eye view looking down upon the virtual world. In FIG. 23, the large circle, with the central area of the virtual world as its center, indicates the general movement range of players and the circles with diagonal lines inside in Area No. 1 indicate the range of the area which Player A frequently visits.

In the case of Player A shown in FIG. 23, the range of movement is concentrated in a certain range in Area No. 1 of the virtual world. Generally, the movement track of most players is concentrated in the vicinity of the central area of the virtual world, and for such players the land around the vicinity of the central area is judged to be of higher value. However, when looking at the movement track of Player A, it is clear that Player A judges the land in Area No. 1, within the area of the circles with diagonal lines inside to be of higher value.

Therefore, the charging unit 62 of the game server 3 determines the fee amount for Player A so that the fee amount on stores and buildings increases when getting closer to Area No. 1 as shown in FIG. 22. In this way, it is possible to levy an appropriate fee on a store or building for each player according to each player's sense of land value in the virtual world.

In addition, while in the above example, a fee amount is determined for each player by using a combination of the value distribution of general land values and the value distribution of each player's land values, a fee amount may also be determined by using only the value distribution of each player's land values.

For example, in an area in the virtual world where there are few architectural structures in a vast extent of land, there are few or no structures such as businesses and stations for use in calculating the fee amount as described above, which makes it difficult to determine an appropriate fee amount.

Since each player's movement track reflects each player's sense of value for various areas, by calculating a fee amount as described above, based on the player's movement track, it is possible to determine an appropriate fee amount for an area where determination of an amount is difficult. In this case, the fee amount may also be determined by combining the general land value with each player's movement track if necessary.

Further, the general land value of respective areas of the virtual world is calculated based on the structures such as businesses, architectural structures, and stations. However, by taking into account statistics of each player's movement track, a land value calculated based on such statistics may also be used as a general land value. In this way, land values appropriate for all the players can be determined.

Further, the land value of each corresponding player may also be determined by readjusting the general land value calculated based on the statistics of each player's movement track using each player's movement track. In this case, the land value can be determined more appropriately for each player.

It is also possible to arbitrarily determine the general land value in the virtual world. For example, the game server 3 can be configured to arbitrarily reduce the value of land in a certain area from what it previously was for a certain period of time. In this way, use of this land is promoted for players to open a business or build an architectural structure.

Embodiment 3

Next, a network game system according to Embodiment 3 of the present invention will be described. In Embodiment 2 as described above, it was configured to determine a land value for each player according to such data as the "movement track" of each player. However, in this Embodiment 3, it is configured to determine an advertisement rate for an object like a billboard based on the statistics of the "movement track" of multiple players.

Figure 24:
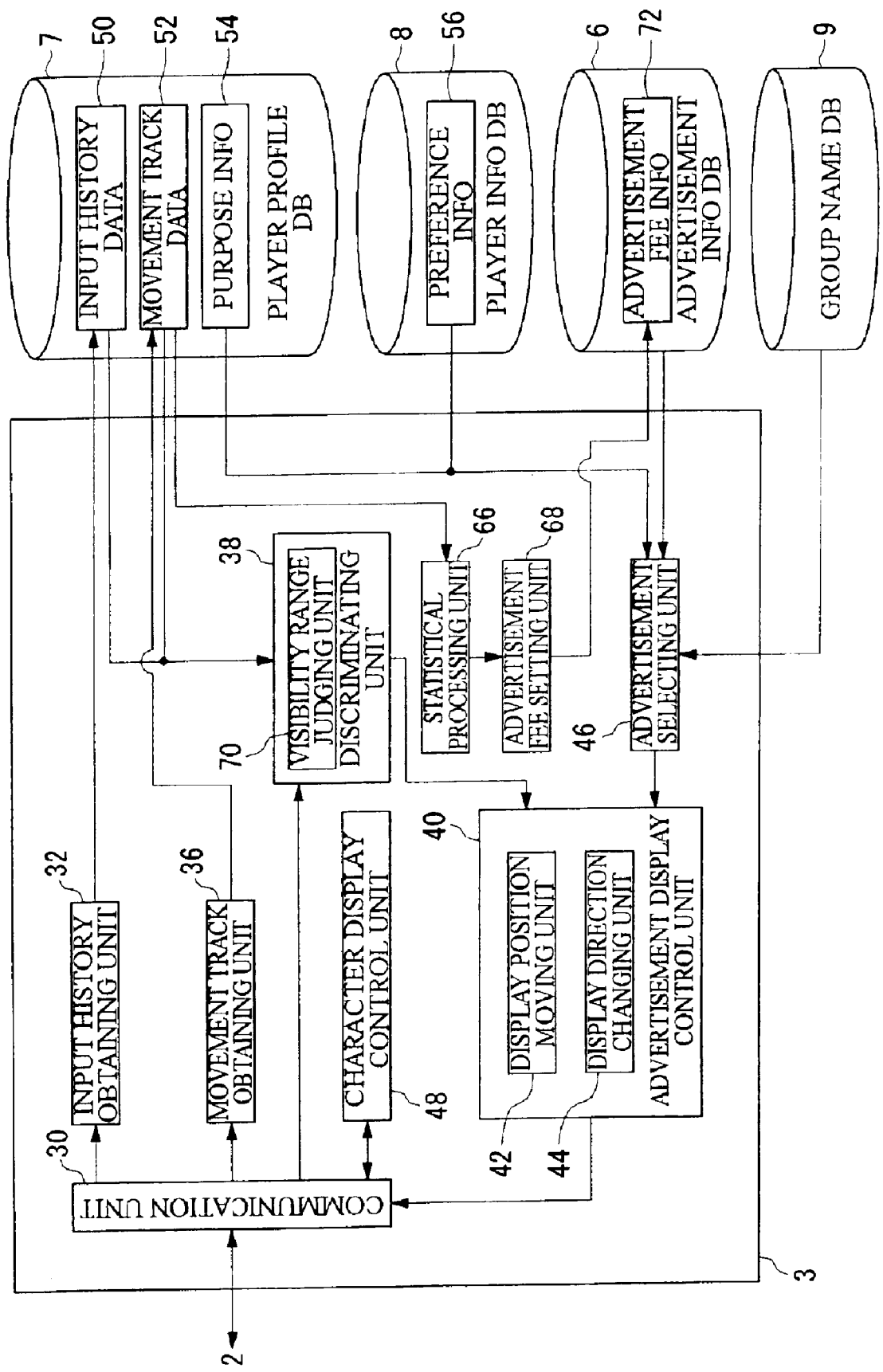
FIG. 24 is a block diagram of the game server according to Embodiment 3.

FIG. 24 is a block diagram of the game server 3 according to Embodiment 3. Hereafter referring to this block diagram, the processes on the game server 3 are explained.

Statistics of the Movement Track of Each Player

The statistical processing unit 66 of the game server 3 compiles statistics from data of each player's movement track stored in the player profile DB 7, for example, by hours, day, week, month, season, or year, and based on the results of such statistics, the advertisement fee setting unit 68 determines an advertisement rate for the installation position of a billboard, that is location of the advertisement and stores it as advertisement fee information 72 in the advertisement information DB 6.

Figure 25:
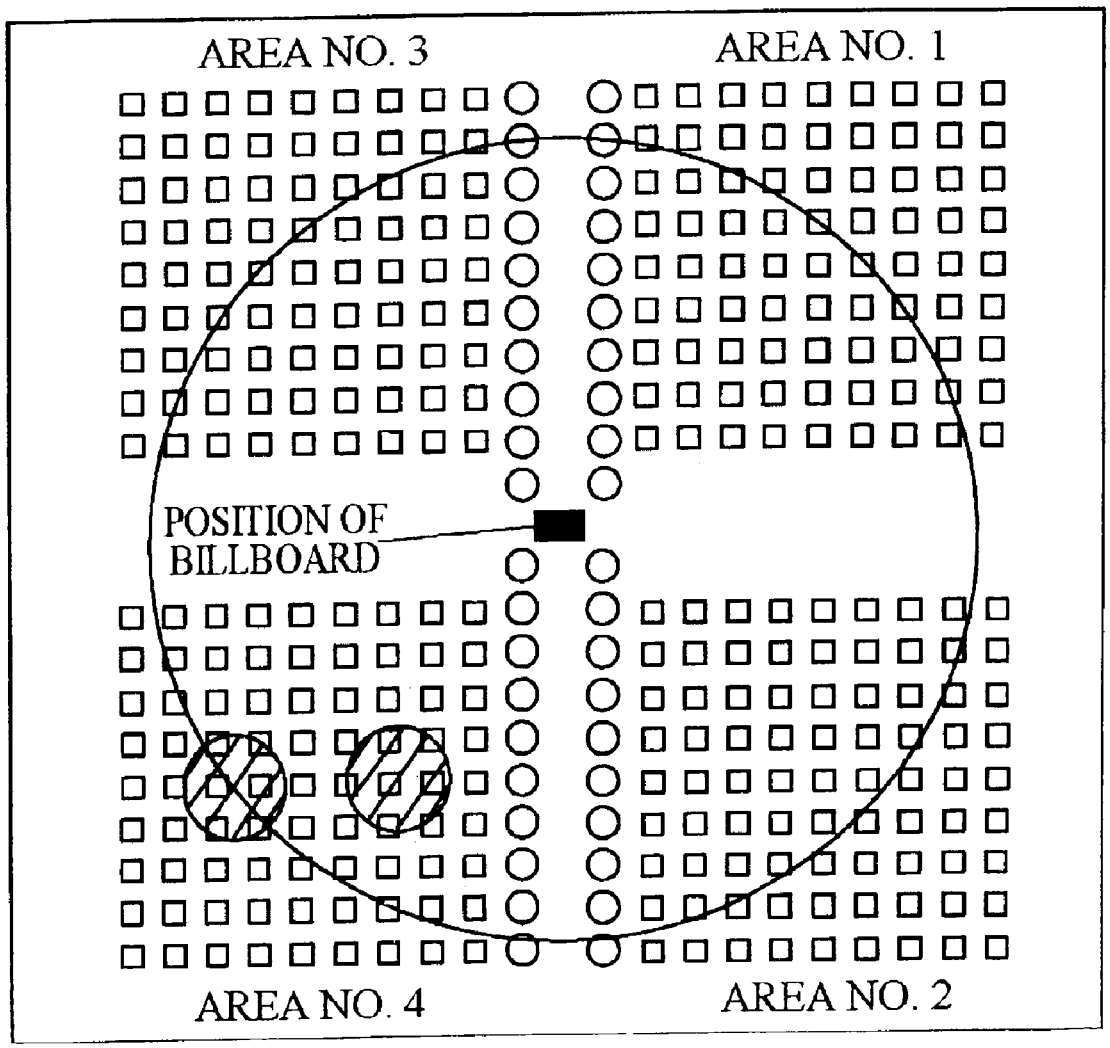
FIG. 25 shows a relationship between an area in a virtual world where players gather and an initial position of a billboard.

FIG. 25 is a diagram showing an example of how an advertisement rate is determined based on such statistics. Generally, since human traffic is heaviest and many businesses are located in the central area of town, which is in the vicinity of the intersection, the installation position of a billboard with the highest advertisement rate is the vicinity of the central area of town. However, as a result of taking statistics of each player's movement track, if many players, in fact, tend to gather in the areas away from the central area of town as shown by the circles with diagonal lines in FIG. 25, advertising impact will be greater by installing a billboard at a position away from the central area of town, where, in fact, many players gather, instead of installing a billboard in the central area of town.

Therefore, if a player who wants a billboard installed wishes to have the billboard installed in the central area of town as shown in FIG. 25, it means that the billboard will be installed at a position where less players gather, and as a result, the advertisement fee setting unit 68 of the game server 3 will charge a lower advertisement fee.

In contrast, if a player who wants a billboard installed wishes to have the billboard installed in the area indicated by the circles with diagonal lines in FIG. 25, where the players actually gather, it means that the billboard will be installed at a position where more players gather, and as a result the advertisement fee setting unit 68 will charge an advertisement fee consistent with the advertising impact. In other words, the advertisement rate increases, as the proximity of the advertisement gets closer to where people actually gather.

By determining the advertisement rate based on the statistics of each player's movement track in the virtual world, it is possible to charge an appropriate advertisement fee consistent with the advertising impact. In addition, the advertisement rate may be determined by averaging each player's land value, or by taking into account the advertisement rate determined for each player.

Moving a Billboard

The areas where the players gather can vary by, for example, hours, day, week, month, season, and year. Therefore, the display position moving unit 42 of the advertisement display control unit 40, based on a request from the player having a billboard installed, moves the billboard or only the advertisement contents to the position where players gather and displays it.

Figure 26:
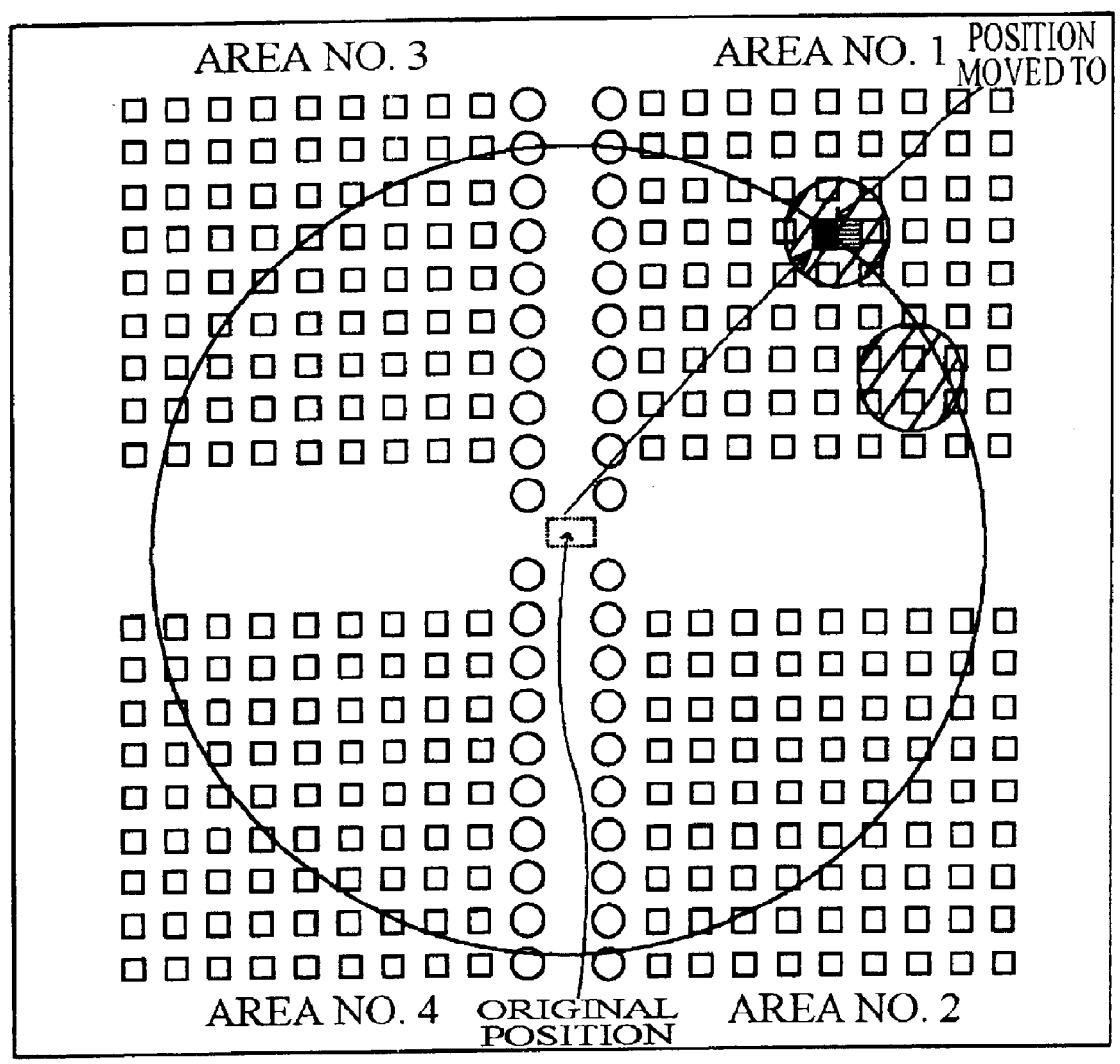
FIG. 26 shows how a billboard is moved to an area in a virtual world where players gather.

In this case, the statistical processing unit 66 monitors each player's movement track and compiles statistics, and as shown by the circles with diagonal lines in FIG. 26, the display position moving unit 42 displays the billboard by moving it to a position where the players are currently gathering or the players are expected to gather.

In this way, a billboard is displayed in whatever area the players are gathering and as a result, the advertiser can attain significant advertising impact and the system administrator can charge this advertiser an advertisement fee appropriate to the impact.

In addition, while in the above example, the billboard itself is moved, it is also possible to configure the system so that only the billboard contents is moved to be displayed on a billboard installed at a position where the players are gathering.

Varying Control of the Direction of a Billboard

The area where the players gather as previously described, may vary by, for example, hours, day, week, month, season, and year. Therefore, the display direction changing unit 44 of the advertisement display control unit 40, based on a request from the player having a billboard installed, varies the direction of a billboard so that the display surface for an item such as an advertisement will face the direction where the players gather.

Figure 27:
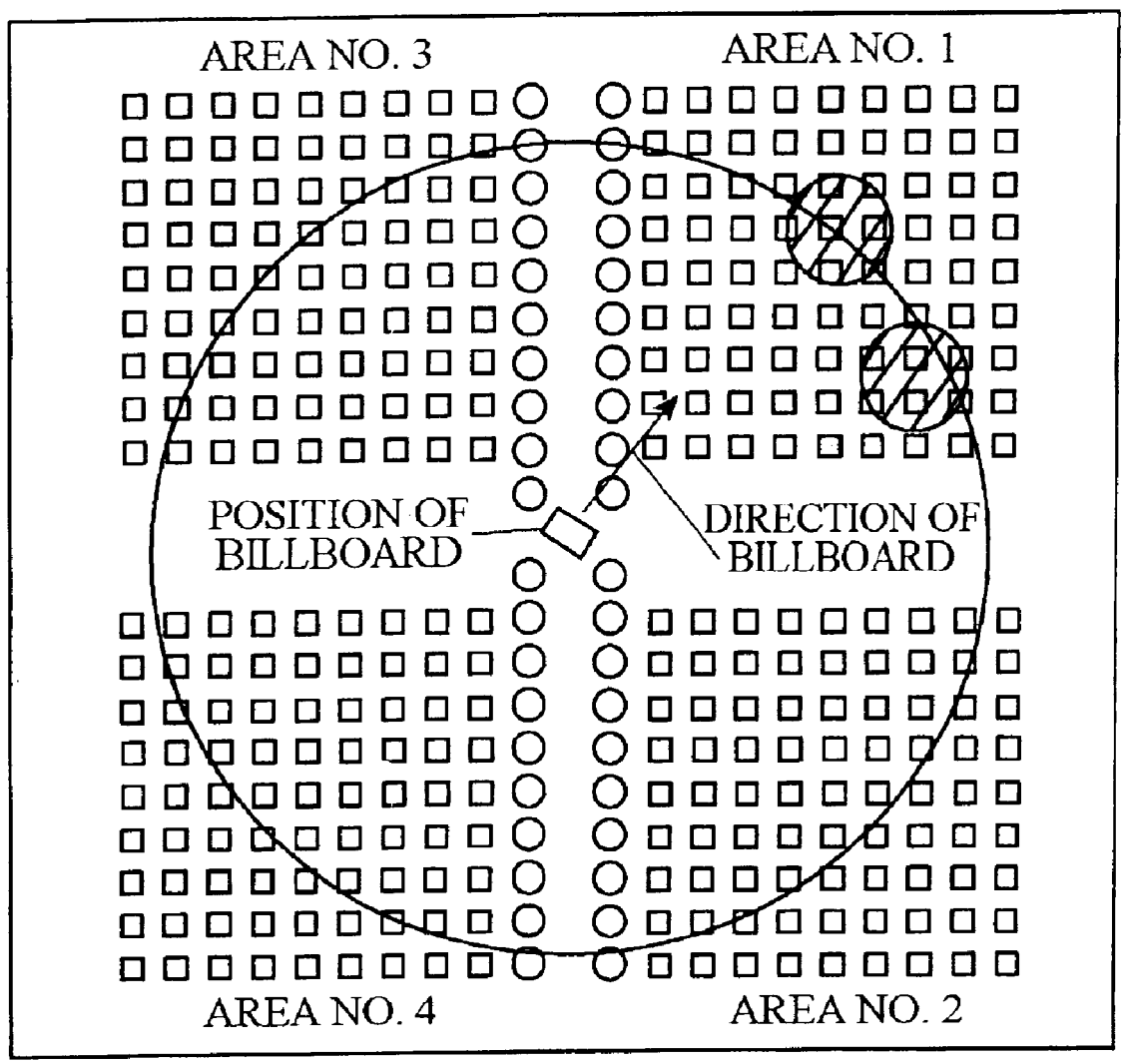
FIG. 27 shows how a display direction of a billboard is changed toward an area in a virtual world where players gather.

In this case, the statistical processing unit 66 monitors each player's movement track and compiles statistics, and as shown by the circles with diagonal lines in FIG. 27, the display direction changing unit 44 varies the direction of a billboard so that the billboard display surface will face the area where the players are currently gathering or the players are expected to gather.

Since the display surface for such an item as an advertisement is displayed facing the area where the players gather, the result will be that a large majority of players will view the contents of the advertisement and the advertiser can attain significant advertising impact. Also, the system administrator can charge this advertiser an advertisement fee appropriate to the impact.

In addition, while in the above example, the direction of a billboard is varied so that it faces the area where the players gather, it may be configured so that the direction of a billboard is varied for each player so that the display surface for such an item as an advertisement will face each player. Further, while in the above description, only the direction of a billboard is changed, the direction of a billboard can be changed after moving the billboard itself to a position where the players gather.

Furthermore, it may be configured so that, after moving the billboard itself to a position where the players gather, the direction of a billboard will be varied for each player so that the display surface for such an item as an advertisement will face each player. In this case, most players will view the billboard, and as a result, the advertiser can attain significant advertising impact.

Display Position Control of a Billboard Taking into Account the Recognition Range In this network game system, a player moves a character in the virtual world while looking at the display screen of the monitor 5 connected to the client terminal 2, and there is a high probability that the direction of this movement corresponds to the direction of the gaze of the player who is looking at the monitor 5.

Further, when a character is moved, blur is displayed in the background through motion blur processing by the game server 3 based on the speed of movement of a character. The amount of motion blur added by motion blur processing gradually increases as the character's movement speed increases, and as a result, it becomes harder for a player who is looking at the monitor 5 to recognize the billboard, background, etc. when the character's movement speed becomes fast. Thus, a character's movement speed by the player's operation corresponds to the angle of the player's visibility.

When a character is moved via the controller 4, the visibility range judging unit 70 of the discriminating unit 38 determines the direction of the player's gaze based on the data indicating the operation direction of the controller 4, and also determines the angle of the player's visibility corresponding to the speed of movement of a character based on the data indicating the continuous operation time for each operation direction of the controller 4. The visibility range judging unit 70 judges the range that the player can view (hereafter also referred to as recognition range) by the direction of the gaze and the angle of visibility of the player. The advertisement display control unit 40 varies the billboard position and the direction of the display surface for an advertisement on the billboard so that it will be positioned within the visibility range.

Figure 28:
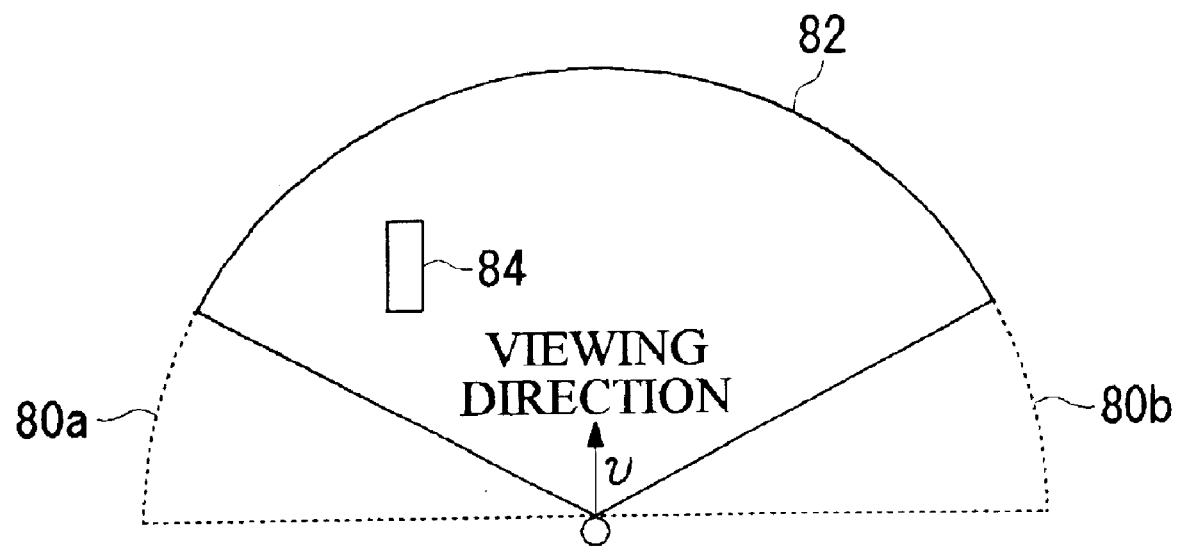
FIGS. 28a and 28b shows how a billboard is installed within a visibility range when speed of movement is different.
Figure 28:
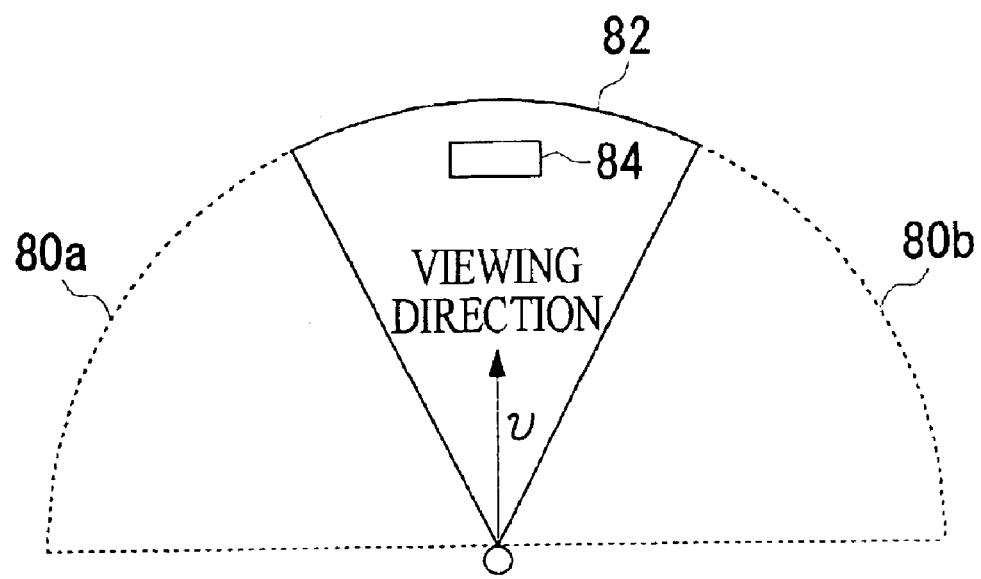

FIGS. 28a and 28b explains how a billboard is installed within the visibility range when the movement speed is different. FIG. 28a shows the case of the low movement speed v. The angle of visibility is large and the visibility range 82 widens to the left and right from the viewing direction. The billboard 84 can be installed within a surrounding area and along the viewing direction, so that it cannot be a hindrance to the player's view and the player can see an advertisement on the billboard 84 when the player takes an interest in the advertisement. FIG. 28b shows the case of the high movement speed v. The angle of visibility is small and the visibility range 82 narrows toward the viewing direction. The surrounding areas 80a and 80b blur by the effect of motion blur. In this case, the billboard 84 is installed far ahead facing the front of the player so that it cannot be affected by motion blur. Thereby the player can see the advertisement of the billboard 84 even when moving to the viewing direction at a high speed.

Thus, when a character's movement speed is fast, a larger amount of blur is added by motion blur to the objects which are closer to the character, and a smaller amount of blur is added by motion blur to the objects which are farther away from the character. Therefore, the display position moving unit 42 of the advertisement display control unit 40 displays an object like a billboard at a position distant from the character. Since a smaller amount of blur is added to the billboard distant from the character, it is easier for a player to recognize an object like a billboard. The fee of the advertisement thus installed within the visibility range is set higher. As the length of time the visibility range is maintained becomes large, the fee of the advertisement installed within the visibility range may increase.

As seen in the above explanation, in a network game system according to Embodiment 3, the areas in the virtual world where the players gather are determined based on the statistics of each player's movement track, and based on the result of this determination, the installation position and direction of an object like a billboard are varied. Further, the recognition range of the players is determined and the installation position of an object such as a billboard is varied so that the position of the object can be located within the recognition range. Since the probability of the billboard being recognized by the players increases, the advertiser can attain high advertising impact.

Embodiment 4

Next, a network game system according to Embodiment 4 of the present invention will be described. In Embodiment 3 as described above, the varying of the installation position of an object like a billboard to be located within the recognition range of each player was described. In a network game system according to Embodiment 4, it is configured so that the land value and advertisement rate are determined by taking into account the statistics of the recognition range of the players.

Detection of the Recognition Range

In Embodiment 4, when a character is moved via the controller 4, the visibility range judging unit 70 of the discriminating unit 38 determines the direction of the player's gaze and the angle of the player's visibility and judges the range that the player sees, in other words, the recognition range, as in Embodiment 3. Further, the visibility range judging unit 70 of Embodiment 4 counts the length of time this recognition range was maintained continuously or intermittently. For each player the visibility range judging unit 70 stores in the player profile DB 7 the information which indicates the recognition range and the length of time the recognition range was maintained.

In addition, with regard to the information to be stored in the player profile DB 7, which indicates the recognition range and the length of time the recognition range was maintained continuously or intermittently, the system may be configured so that only when the recognition range was maintained for a predetermined length of time or longer, will it be saved in the player profile DB 7, for example, the information will be stored in the player profile DB 7 only when a recognition range was maintained continuously or intermittently for 3 seconds or longer. Thereby, the visibility range judging unit 70 can obtain as a user's visibility range the visibility range which was maintained for a predetermined length of time or longer.

Determination of an Advertisement Rate and Land Value According to the Recognition Range When the visibility range judging unit 70 thus determines the recognition range and the time it was maintained, the advertisement fee setting unit 68 determines a revised advertisement rate based on the advertisement rate which was determined based on each player's movement track as described above and taking into account the recognition range and time it was maintained. In addition, the visibility range judging unit 70 may be also provided in Embodiment 2 so that the land value can be set based on the recognition range and a revised land value can be determined based on the length of time the recognition range was maintained.

Specifically, as described above, the advertisement rate and land value in the areas where the players gather become higher, however, even in those areas where the players gather, there are areas which are clearly in the recognition range of the players and areas which are not clearly in the recognition range of the players.

Therefore, even among those areas where the players may gather, the game server 3 determines the advertisement rate and land value based on the recognition range and time it was maintained as described above: the advertisement rate and land value for the areas which are clearly in the recognition range of the players are set higher than those for the other areas, and the advertisement rate and land value for the areas which are not clearly in the recognition range of the players are set lower than those for the other areas.

The advertisement rates and land values in the entire virtual world can be determined in detail, which makes it possible to charge an appropriate advertisement fee and levy a fee for the land to the player who will be an advertiser or the player who will open a business or build an architectural structure in the virtual world.

Although the present invention has been described by way of exemplary embodiments, it should be understood that many changes and substitutions may be made by those skilled in the art without departing from the scope of the present invention which is defined by the appended claims. Some such alterations are stated as follows.

A part of the functional blocks of the game server 3 may be provided in the client terminal 2. For instance, the input history obtaining unit 32, the movement track obtaining unit 36, the discriminating unit 38, and the player profile DB 7 may be provided in the client terminal 2, and the client terminal 2 may store the user profile and judge whether the user profile needs to be applied or not. When applying the user profile, the advertisement display control unit 40 of the game server 3 may display the display object on the client terminal 2 after changing its display condition according to the user's input history and the movement track. Furthermore, many other configurations can be considered in which the functional blocks are distributed in the client terminal 2 and the game server 3 in various ways. For instance, the functional blocks are duplicated in the client terminal 2 and the game server 3 so that the operation can continue only in the client terminal 2 in case the network 1 is in bad condition.

Although in the above explanation, the discriminating unit 38 of the game server 3 determines whether or not the user profile needs to be applied, the user may determine the timing of reflecting the user profile and instruct to apply the user profile by pressing a button on the controller 4 of the client terminal 2.

What is claimed is:

1. An object display apparatus comprising:
   an input history obtaining unit which obtains an input history of a user's operation for moving an operational object in a virtual world and stores the input history as a user profile;
   a discriminating unit which examines whether or not a current operation of the user for moving the operational object reflect the stored input history and thereby determines whether the user profile needs to be applied or not; and
   a display control unit which displays a display object on which information is displayed to be recognized by the user in the virtual world in such a manner that the display object is visible to the user according to speed of movement of the operational object which is judged from the input history, when the discriminating unit determines that the user profile needs to be applied.

2. The apparatus of claim 1, wherein the display control unit adjusts a distance between a display position of the display object and a view position of the user according to the speed of movement.

3. The apparatus of claim 2, wherein the display control unit adjusts a direction of the display object toward a view direction of the user according to the speed of movement.

4. The apparatus of claim 1, wherein the display control unit adjusts a direction of the display object toward a view direction of the user according to the speed of movement.

5. The apparatus of claim 1, further comprising a selecting unit which selects the information to be displayed on the display object according to a preference of the user.

6. The apparatus of claim 1, further comprising a selecting unit which selects the information to be displayed on the display object according to a purpose of the user's exploring the virtual world.

7. The apparatus of claim 1, further comprising a selecting unit which selects different information to be displayed on the display object according to areas in the virtual world or according to time when a user explores the virtual world.

8. The apparatus of claim 1, further comprising a selecting unit which selects same information to be displayed on the display object for each of users who explore the virtual world as a same group.

9. The apparatus of claim 1, further comprising a visibility range judging unit which judges a range of visibility of a user who sees the virtual world based on a direction of movement and a speed of movement of the operational object which the user operates in the virtual world, and wherein the display control unit displays the display object within the judged visibility range.

10. The apparatus of claim 1, further comprising a land value setting unit which sets for each user a land value for an area in the virtual world based on the movement track of the operational object of the user.

11. The apparatus of claim 10, wherein the land value setting unit sets for each user a temporary land value for the area in the virtual world based on the movement track of the operational object of the user, and then sets a land value to be charged to each user based on the temporary land value and a general land value for the area in the virtual world.

12. The apparatus of claim 10, further comprising a visibility range judging unit which judges a range of visibility of a user who sees the virtual world based on a direction of movement and a speed of movement of the user in the virtual world, and wherein the land value setting unit sets for each user a land value for an area in the virtual world based on the movement track and the visibility range of the user.

13. The apparatus of claim 10, further comprising an advertisement fee setting unit which determines an advertisement fee when a user displays an advertisement in an area by averaging the land values of the area set for respective users.

14. An object display apparatus comprising:
a movement track obtaining unit which obtains a movement track of an operational object which can be operated by a user in a virtual world and stores the movement track as a user profile;
a discriminating unit which examines whether or not the operational object is moving along the stored movement track and thereby determines whether the user profile needs to be applied or not; and
a display control unit which displays a display object on which information is displayed to be recognized by the user in the virtual world in such a manner that the display object is visible to the user based on the movement track of the operational object, when the discriminating unit determines that the user profile needs to be applied.

15. The apparatus of claim 14, wherein the display control unit changes a display position of the display object based on the movement track.

16. The apparatus of claim 15, wherein the display control unit changes a display direction of the display object based on the movement track.

17. The apparatus of claim 14, wherein the display control unit changes a display direction of the display object based on the movement track.

18. The apparatus of claim 14, further comprising a selecting unit which selects the information to be displayed on the display object according to a preference of the user.

19. The apparatus of claim 14, further comprising a selecting unit which selects the information to be displayed on the display object according to a purpose of the user's exploring the virtual world.

20. The apparatus of claim 14, further comprising a selecting unit which selects different information to be displayed on the display object according to areas in the virtual world or according to time when a user explores the virtual world.

21. The apparatus of claim 14, further comprising a selecting unit which selects same information to be displayed on the display object for each of users who explore the virtual world as a same group.

22. The apparatus of claim 14, further comprising a visibility range judging unit which judges a range of visibility of a user who sees the virtual world based on a direction of movement and a speed of movement of the operational object which the user operates in the virtual world, and wherein the display control unit displays the display object within the judged visibility range.

23. The apparatus of claim 14, further comprising a land value setting unit which sets for each user a land value for an area in the virtual world based on the movement track of the operational object of the user.

24. The apparatus of claim 23, wherein the land value setting unit which sets for each user a temporary land value for the area in the virtual world based on the movement track of the operational object of the user, and then sets a land value to be charged to each user based on the temporary land value and a general land value for the area in the virtual world.

25. The apparatus of claim 23, further comprising a visibility range judging unit which judges a range of visibility of a user who sees the virtual world based on a direction of movement and a speed of movement of the user in the virtual world, and wherein the land value setting unit sets for each user a land value for an area in the virtual world based on the movement track and the visibility range of the user.

26. The apparatus of claim 23, further comprising an advertisement fee setting unit which determines an advertisement fee when a user displays an advertisement in an area by averaging the land values of the area set for respective users.

27. An object display apparatus comprising:
a movement track obtaining unit which obtains a plurality of movement tracks each of which is a movement track of an operational object which each of a plurality of users operates in a virtual world and determines an area where the operational objects operated by the plurality of the users gather;
a visibility range judging unit which judges a range of visibility of a user who sees the virtual world based on a direction of movement and a speed of movement of the operational object which the user operates in the virtual world; and
a display control unit which displays a display object on which information is displayed to be recognized by a user in such a manner that the display object lies within the range of visibility judged for each user who comes into the area in the virtual world where the operational objects gather.

28. The apparatus of claim 27, wherein the display control unit moves the display object from a predetermined initial display position to the area in the virtual world where the operational objects gather.

29. The apparatus of claim 27, further comprising an advertisement fee setting unit which sets a fee for an advertisement to be displayed in an area in the virtual world, based on a result of taking statistics of the movement tracks of the operational objects of the respective users.

30. The apparatus of claim 29, wherein the advertisement fee setting unit sets a temporary fee for the advertisement to be displayed in the area in the virtual world based on the result of taking statistics of the movement tracks of the operational objects of the respective users, and then sets an advertisement fee to be charged based on the temporary fee and a general advertisement fee of the area in the virtual world.

31. The apparatus of claim 29, wherein the advertisement fee setting unit adds a prescribed additional fee to the fee for the advertisement when the display control unit changes a direction of the advertisement so that a display surface of the advertisement can face the area where the operational objects gather.

32. The apparatus of claim 29, wherein the advertisement fee setting unit adds a prescribed additional fee to the fee for the advertisement when the display control unit displays the advertisement after moving the advertisement to the area where the operational objects gather.

33. The apparatus of claim 29, further comprising a visibility range judging unit which judges a range of visibility of a user who sees the virtual world based on a direction of movement and a speed of movement of the user in the virtual world, and wherein the advertisement fee setting unit adds a prescribed additional fee to the fee for the advertisement when the display control unit displays the advertisement within the visibility range.

34. The apparatus of claim 33, wherein the visibility range judging unit detects a length of time a same visibility range is maintained continuously by a user and obtains the range as a visibility range of the user if the length of time exceeds a prescribed value.

35. An object display system comprising a terminal and a server which are connected to a network, wherein the terminal comprises:
an obtaining unit which obtains data of a user's operation for moving an operational object in a virtual world;
a communication unit which sends the data of the operation to the server and receives from the server data of an object in the virtual world corresponding to the operation; and
a display unit which displays an image of the virtual world using the data of the object, and
wherein the server comprises:
an input history obtaining unit which obtains an input history of a user's movement operation from the data of the operation received from the terminal and stores the input history; and
a display control unit which displays on the terminal a display object on which information is displayed to be recognized by the user in the virtual world in such a manner that the display object is visible to the user according to speed of movement of the operational object which is judged from the input history.

36. An object display method comprising:
detecting a speed of movement of an operational object which a user can operate in a virtual world;
judging a range of visibility of a user who sees the virtual world based on a direction of movement and the speed of movement of the operational object which the user operates in the virtual world; and
displaying a display object on which information is displayed to be recognized by the user in the virtual world in such a manner that a display position and a display direction of the display object are adjusted within the judged range of visibility according to the detected speed of movement.

37. An object display method comprising:
detecting a movement track of an operational object which a user can operate in a virtual world;
judging a range of visibility of a user who sees the virtual world based on a direction of movement and a speed of movement of the operational object which the user operates in the virtual world; and
displaying a display object on which information is displayed to be recognized by the user in the virtual world in such a manner that a display position of the display object is changed from a predefined initial display position to within the judged range of visibility and a display direction of the display object is changed from a predefined initial display direction according to the detected movement track.

38. An object display method comprising:
detecting a movement track of an operational object which a user can operate in a virtual world;
determining an area in the virtual world where a plurality of the operational objects gather based on the movement tracks of a plurality of users;
judging a range of visibility of a user who sees the virtual world based on a direction of movement and a speed of movement of the operational object which the user operates in the virtual world; and
displaying a display object on which information is displayed to be recognized by a user in such a manner that the display object lies within the range of visibility judged for each user who comes in the area where the plurality of the operational objects gather.

39. A method for setting an advertisement fee in a virtual world comprising:
detecting movement tracks of a plurality of users who explore the virtual world;
taking statistics of the detected movement tracks of the plurality of the users;
setting an advertisement fee of an area in the virtual world based on the statistics of the movement tracks of the plurality of the users; and
judging a range of visibility of each user who sees the virtual world based on a direction of movement and a speed of movement for the user in the virtual world; and
adding a prescribed additional fee to a fee for an advertisement when an advertisement is displayed within the judged visibility range.

* * * * *